(12) United States Patent
Liu et al.

(10) Patent No.: US 11,006,106 B2
(45) Date of Patent: May 11, 2021

(54) SIMPLIFIED ENTROPY CODING FOR SUB-BLOCK BASED MOTION INFORMATION LIST

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 16/998,348

(22) Filed: Aug. 20, 2020

(65) Prior Publication Data
US 2020/0382771 A1    Dec. 3, 2020

Related U.S. Application Data

(63) Continuation of application No. PCT/IB2019/059052, filed on Oct. 23, 2019.

(30) Foreign Application Priority Data

Oct. 31, 2008    (WO) ............... PCT/CN2018/111403

(51) Int. Cl.
*H04N 19/105*    (2014.01)
*H04N 19/139*    (2014.01)
*H04N 19/176*    (2014.01)

(52) U.S. Cl.
CPC ......... *H04N 19/105* (2014.11); *H04N 19/139* (2014.11); *H04N 19/176* (2014.11)

(58) Field of Classification Search
CPC ... H04N 19/105; H04N 19/176; H04N 19/139
See application file for complete search history.

(56) References Cited

U.S. PATENT DOCUMENTS 6,275,532 B1    8/2001    Hibi et al.
9,438,910 B1    9/2016    Han et al.
(Continued)

FOREIGN PATENT DOCUMENTS

WO    2017157259 A1    9/2017

OTHER PUBLICATIONS

Akula et al. "Description of SDR, HDR and 360 degrees Video Coding Technology Proposal Considering Mobile Application Scenario by Samsung, Huawei, GoPro, and HiSilicon," buJoint Video Exploration Team (JVET) of ITU-T SG 16 WP 3 and ISO/IEC JTC 1/SC 29/WG 11, 10th Meeting, San Diego, US, Apr. 10-20, 2018, document JVET-J0024, 2018.

(Continued)

*Primary Examiner* — Francis Geroleo
(74) *Attorney, Agent, or Firm* — Perkins Coie LLP

(57) ABSTRACT

Devices, systems and methods for digital video coding, which include adaptive control point selection for affine coding, are described. An exemplary method for video processing includes selecting, for a conversion between a current block of a video and a bitstream representation of the video, a plurality of control points for the current block, the plurality of control points comprising at least one non-corner point of the current block, and each of the plurality of control points being representative of an affine motion of the current block; and performing, based on the plurality of control points, the conversion between the current block and the bitstream representation.

15 Claims, 39 Drawing Sheets

(56) References Cited

U.S. PATENT DOCUMENTS

| | | | |
|---|---|---|---|
| 2011/0103487 A1 | 5/2011 | Pateux et al. | |
| 2013/0114673 A1* | 5/2013 | Chien | H04N 19/91 375/240.02 |
| 2014/0328396 A1* | 11/2014 | Guo | H04N 19/91 375/240.03 |
| 2018/0278966 A1 | 9/2018 | Lim et al. | |
| 2018/0288430 A1* | 10/2018 | Chen | H04N 19/70 |
| 2018/0359483 A1* | 12/2018 | Chen | H04N 19/44 |
| 2020/0120335 A1* | 4/2020 | Hung | H04N 19/105 |

OTHER PUBLICATIONS

Bross et al. "Versatile Video Coding (draft2)," Joint Video Experts Team (JVET) of ITU-T SG 16 WP 3 and ISO/IEC JTC 1/SC 29/WG 11, 11th Meeting, Ljubljana, SI, Jul. 10-18, 2018, JVET-K1001, 2018.

Chen et al. "CE4: Separate List for Sub-Block Merge Candidate (Test 4.2.8)," Joint Video Experts Team (JVET) of ITU-T SG 16 WP 3 and Iso/IEC JTC 1/SC 29/WG 11, 12th Meeting, Macao, CN, Oct. 3-12, 2018, document JVET-L0369, 2018.

Chen et al. "Algorithm Description of Joint Video Exploration Test Model 7 (JEM 7)," Joint Video Exploration Team (JVET) of ITU-T SG 16 WP 3 and ISO/IEC JTC 1/SC 29/WG 11, 7th Meeting, Torino, IT, Jul. 13-21, 2017, document JVET-G1001, 2017.

Han et al. "CE4.1.3: Affine Motion Compensation Prediction," Joint Video Exploration Team (JVET) of ITU-T SG 16 WP 3 and ISO/IEC JTC 1/SC 29/WG 11, 11th meeting, Ljubljana, SI, Jul. 10-18, 2018, document JVET-K0337, 2018.

He et al. "CE4-related: Adaptive Precision for Affine MVD Coding," Joint Video Experts Team (JVET) of ITU-T SG 16 WP 3 and ISO/IEC JTC 1/SC 29/WG11, 12th Meeting, Macao, CN, Oct. 3-12, 2018, document JVET-L0259, 2018.

Huang et al. "Control Point Representation and Differential Coding Affine_Motion Compensation," IEEE Transactions on Circuits and Systems for Video Technology, Oct. 2013, 23(10):1651-1660.

Jeong et al. "Proposed WD for CE4 Ultimate Motion Vector Expression (Test 4.5.4)," Joint Video Experts Team (JVET) of ITU-T SG 16 WP 3 and ISO/IEC JTC 1/SC 29/WG11, 12th Meeting, Macao, CN, Oct. 3-12, 2018, document JVET-L0054, 2018.

Kordasiewicz et al. "Affine Motion Prediction Based on Translational Motion Vectors," IEEE Transactions on Circuits and Systems for Video Technology, Oct. 2007, 17(10):1388-1394.

Laroche et al. "CE4-Related: n Merge Index Coding," Joint Video Experts Team (JVET) of ITU-T SG 16 WP 3 and ISO/IEC JTC 1/SC 29/WG11, 12th Meeting, Macao, CN, Oct. 3-12, 2018, document JVET-L0194, 2018.

Laroche et al. "CE2: On Subblock Merge Index Coding (Test CE2.2.2)," Joint Video Experts Team (JVET) of ITU-T SG 16 WP 3 and ISO/IEC JTC 1/SC 29/WG11, 13th Meeting, Marrakech, MA, Jan. 9-18, 2019, document JVET-M0381, 2019.

Li et al. "An Efficient Four-Parameter Affine Video Motion Model for Video Coding," IEEE Transctions of Circuits and Systems for Video Technology, 2017, 1-14.

Liao et al. "CE10.3.1.b: Triangular Prediction Unit Mode," Joint Video Exploration Team (JVET) of ITU-T SG 16 WP 3 and ISO/IEC JTC 1/SC 29/WG11, 12th Meeting, Macao, CN, Oct. 3-12, 2018, document JVET-L0124, 2018.

Mora et al. "CE3-Related: Decoder-side Intra Mode Derivation," Joint Video Experts Team (JVET) of ITU-T SG 16 WP 3 and ISO/IEC JTC 1/SC 29/WG11, 12th Meeting, Macao, CN, Oct. 3-12, 2018, document JVET-L0164, 2018.

Rosewarne et al. "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11, 25th Meeting, Chengdu, CN, Oct. 14-21, 2016, document JCTVC-Y1002, 2016.

Zhang et al. "CE4-Related: Affine Model Inheritance from Single-Line Motion Vectors," Joint Video Experts Team (JVET) of ITU-T SG 16 WP 3 and ISO/IEC JTC 1/SC 29/WG11, 12th Meeting, Macao, CN, Oct. 3-12, 2018, Document JVET-L0330, 2018.

"High Efficiency Video Coding" Series VI: Audiovisual and Multimedia Systems: Infrastructure of Audiovisual Services—Coding of Moving Video, ITU-T, H.265, 2018.

JEM-7.0:—https://jvet.hhi.fraunhofer.de/svn/svn_HMJEMSoftware/tags/ HM-16.6-38JEM-7.0 (Accessed on Apr. 21, 2020).

International Search Report and Written Opinion from International Patent Application No. PCT/IB2019/059051 dated Mar. 23, 2020 (21 pages).

International Search Report and Written Opinion from International Patent Application No. PCT/IB2019/059052 dated Jan. 17, 2020 (16 pages).

International Search Report and Written Opinion from International Patent Application No. PCT/IB2019/059053 dated Jan. 23, 2020 (17 pages).

* cited by examiner

FIG. 16

SIMPLIFIED ENTROPY CODING FOR SUB-BLOCK BASED MOTION INFORMATION LIST

CROSS-REFERENCE TO RELATED APPLICATIONS

This application is a continuation of International Application No. PCT/IB2019/059052, filed on Oct. 23, 2019, which claims the priority to and benefits of International Patent Application No. PCT/CN2018/111403, filed on Oct. 23, 2018. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, which include adaptive control point selection for affine coding, are described. The described methods may be applied to both the existing video coding standards (e.g., High Efficiency Video Coding (HEVC)) and future video coding standards or video codecs.

In one representative aspect, the disclosed technology may be used to provide a method for video processing. This method includes selecting, for a conversion between a current block of a video and a bitstream representation of the video, a plurality of control points for the current block, the plurality of control points comprising at least one non-corner point of the current block, and each of the plurality of control points being representative of an affine motion of the current block; and performing, based on the plurality of control points, the conversion between the current block and the bitstream representation.

In another representative aspect, the disclosed technology may be used to provide a method for video processing. This method includes determining, for a conversion between a current block of a video and a bitstream representation of the video, that at least one of a plurality of bins used to code a merge index of a sub-block merge-based merge candidate list uses bypass coding based on a condition; and performing, based on the determining, the conversion.

In yet another representative aspect, the disclosed technology may be used to provide a method for video processing. This method includes selecting, for a conversion between a current block of video and a bitstream representation of the video, a plurality of control points for the current block, the plurality of control points comprising at least one non-corner point of the current block, and each of the plurality of control points being representative of an affine motion of the current block; deriving motion vectors for one or more control points of the plurality of control points based on control point motion vectors (CPMVs) of one or more neighboring blocks of the current block; and performing, based on the plurality of control points and the motion vectors, the conversion between the current block and the bitstream representation.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 16 shows an example of motion vector storage.

DETAILED DESCRIPTION

Figure 1:
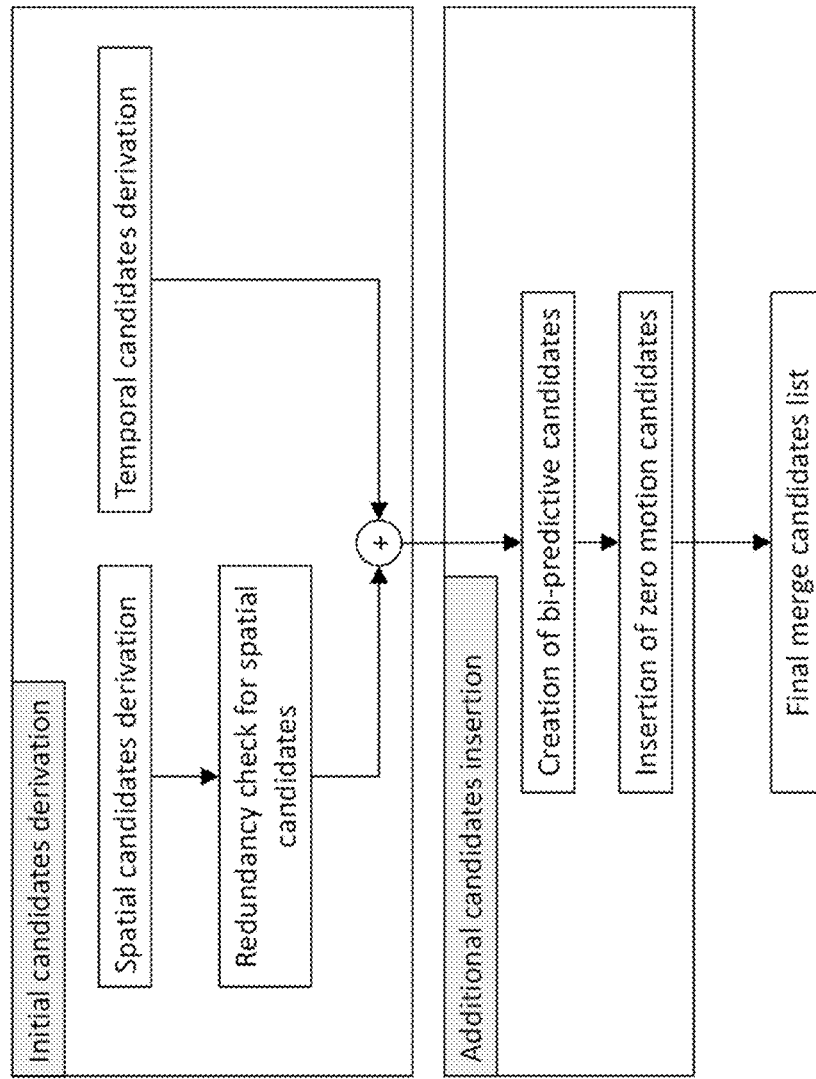
FIG. 1 shows an example of constructing a merge candidate list.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

1.1 Examples of Prediction Modes

Each inter-predicted PU (prediction unit) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

1.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates FIG. 1 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signaled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

1.1.2 Constructing Spatial Merge Candidates

Figure 2:
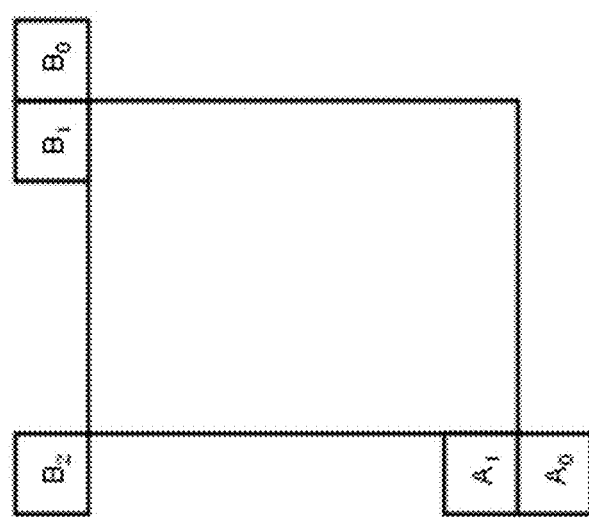
FIG. 2 shows an example of positions of spatial candidates.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
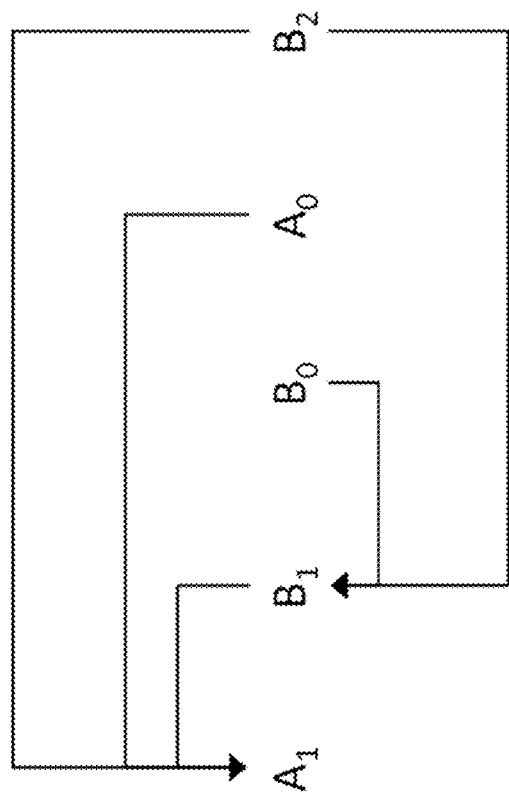
FIG. 3 shows an example of candidate pairs subject to a redundancy check of spatial merge candidates.
Figure 4B:
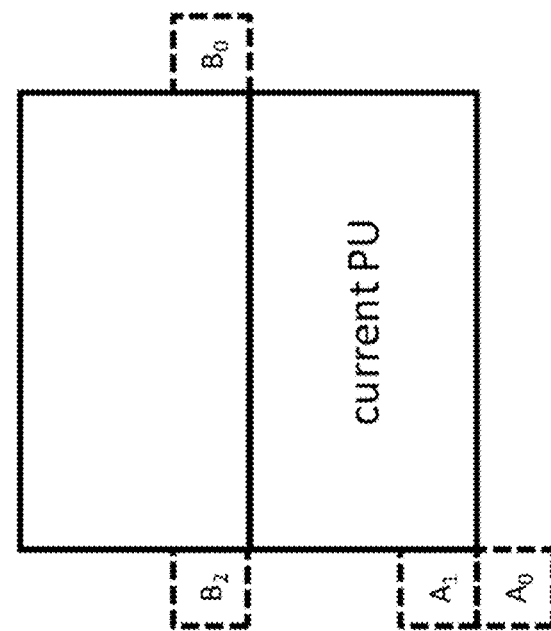
FIGS. 4A and 4B show examples of the position of a second prediction unit (PU) based on the size and shape of the current block.
Figure 4A:
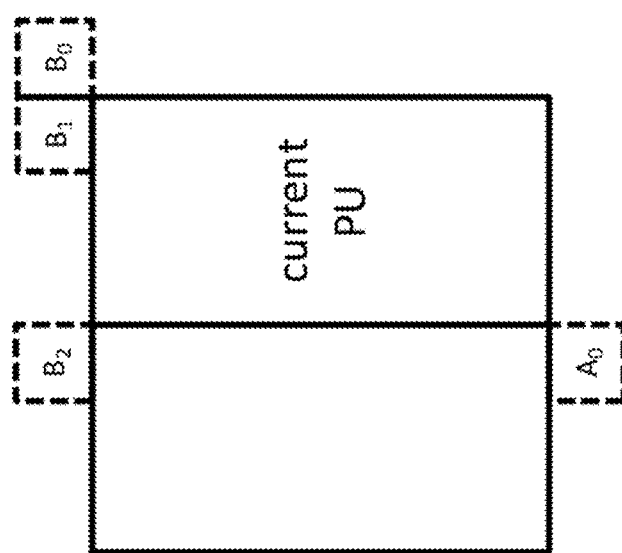

To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4A and 4B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B_1$ is not considered when the current PU is partitioned as 2N×N.

1.1.3 Constructing Temporal Merge Candidates

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header.

Figure 5:
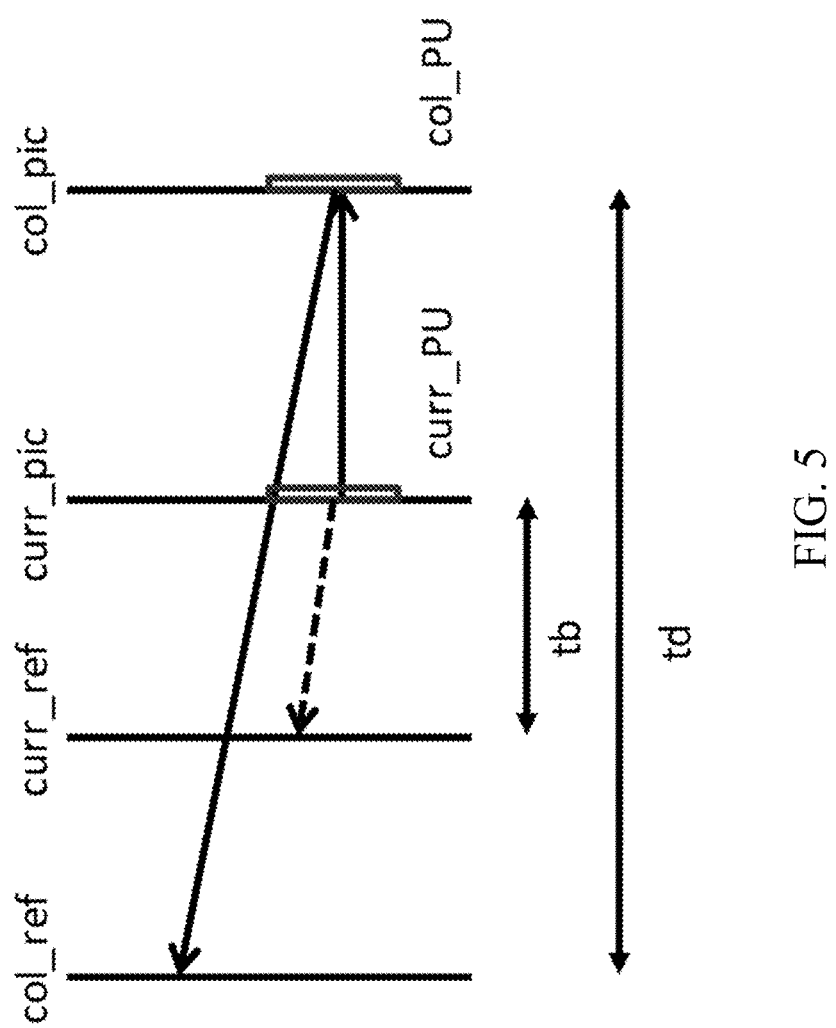
FIG. 5 shows an example of motion vector scaling for temporal merge candidates.

FIG. 5 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 6:
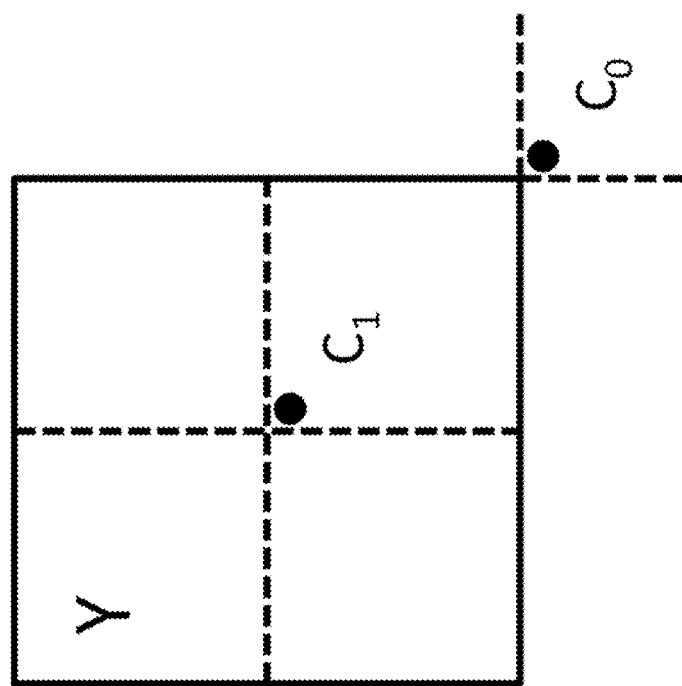
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU, position $C_1$ is used. Otherwise, position $C_0$ is used in the derivation of the temporal merge candidate.

1.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 7:
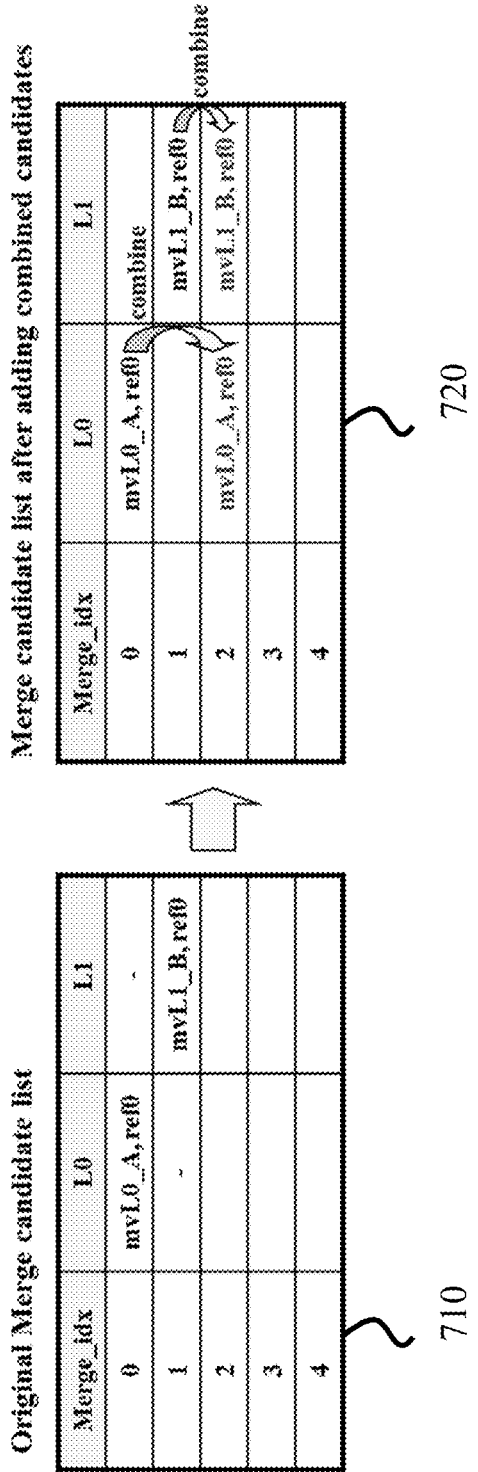
FIG. 7 shows an example of generating a combined bi-predictive merge candidate.

FIG. 7 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

1.1.5 Examples of Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, a motion estimation region (MER) may be defined. The size of the MER may be signaled in the picture parameter set (PPS) using the "log2_parallel_merge_level_minus2" syntax element. When a MER is defined, merge candidates falling in the same region are marked as unavailable and therefore not considered in the list construction.

1.2 Embodiments of Advanced Motion Vector Prediction (AMVP)

AMVP exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

1.2.1 Examples of Constructing Motion Vector Prediction Candidates

Figure 8:
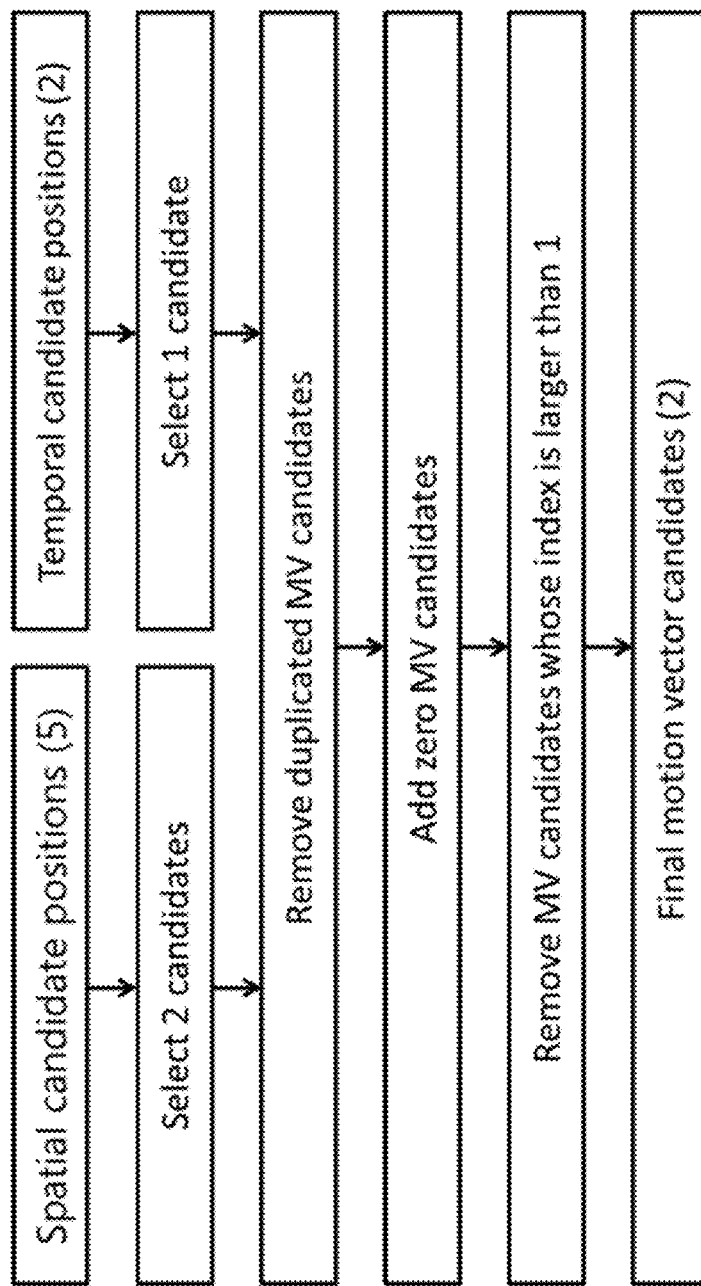
FIG. 8 shows an example of constructing motion vector prediction candidates.

FIG. 8 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

1.2.2 Constructing Spatial Motion Vector Candidates

In the derivation of spatial motion vector candidates, a maximum of two candidates are considered among five potential candidates, which are derived from PUs located in positions as previously shown in FIG. 2, those positions being the same as those of motion merge. The order of derivation for the left side of the current PU is defined as $A_0$, $A_1$, and scaled $A_0$, scaled $A_0$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No Spatial Scaling (1) Same reference picture list, and same reference picture index (same POC)

(2) Different reference picture list, but same reference picture (same POC)

Spatial Scaling (3) Same reference picture list, but different reference picture (different POC)

(4) Different reference picture list, and different reference picture (different POC)

The no-spatial-scaling cases are checked first followed by the cases that allow spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
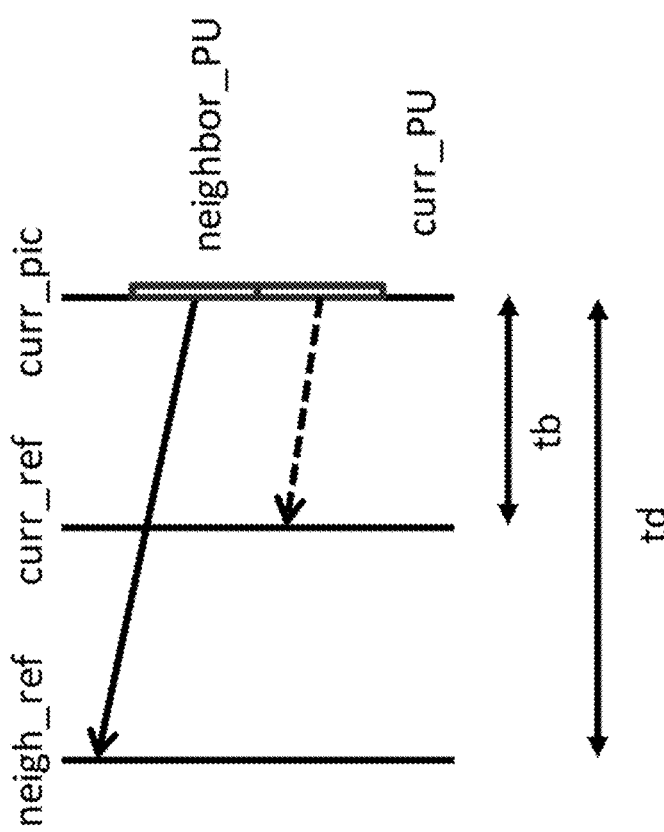
FIG. 9 shows an example of motion vector scaling for spatial motion vector candidates.

As shown in the example in FIG. 9, for the spatial scaling case, the motion vector of the neighboring PU is scaled in a similar manner as for temporal scaling. One difference is that the reference picture list and index of current PU is given as input; the actual scaling process is the same as that of temporal scaling.

1.2.3 Constructing Temporal Motion Vector Candidates

Apart from the reference picture index derivation, all processes for the derivation of temporal merge candidates are the same as for the derivation of spatial motion vector candidates (as shown in the example in FIG. 6). In some embodiments, the reference picture index is signaled to the decoder.

2. Example of Inter Prediction Methods in Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

2.1 Examples of Sub-CU Based Motion Vector Prediction

In the JEM with quadtrees plus binary trees (QTBT), each CU can have at most one set of motion parameters for each prediction direction. In some embodiments, two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector. In some embodiments, and to preserve more accurate motion field for sub-CU motion prediction, the motion compression for the reference frames may be disabled.

2.1.1 Examples of Alternative Temporal Motion Vector Prediction (ATMVP)

In the ATMVP method, which is also referred to sub-block temporal motion vector prediction (sbTMVP) method, the temporal motion vector prediction (TMVP) method is modified by fetching multiple sets of motion information (including motion vectors and reference indices) from blocks smaller than the current CU.

Figure 10:
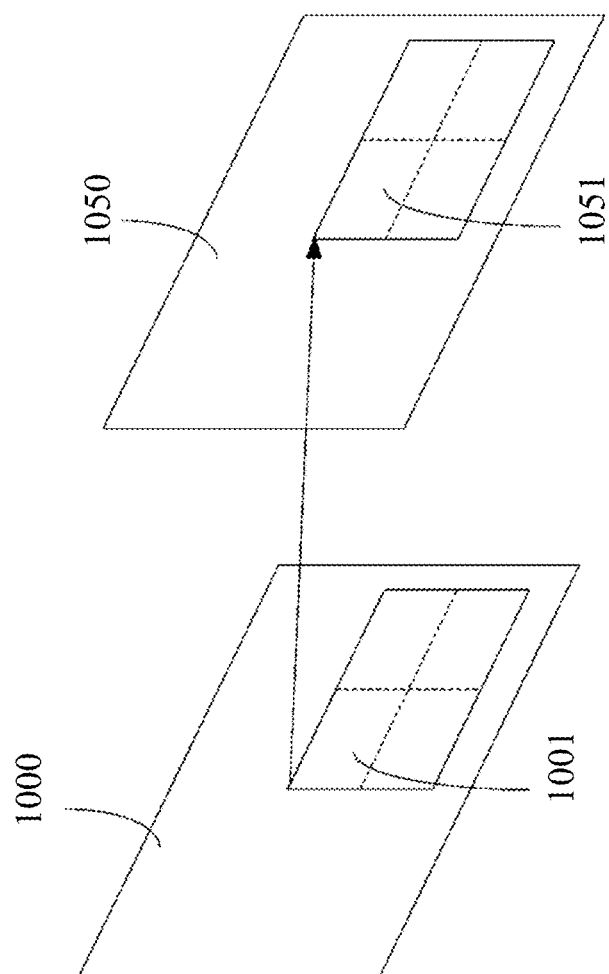
FIG. 10 shows an example of motion prediction using the alternative temporal motion vector prediction (ATMVP) algorithm for a coding unit (CU).

FIG. 10 shows an example of ATMVP motion prediction process for a CU 1000. The ATMVP method predicts the motion vectors of the sub-CUs 1001 within a CU 1000 in two steps. The first step is to identify the corresponding block 1051 in a reference picture 1050 with a temporal vector. The reference picture 1050 is also referred to as the motion source picture. The second step is to split the current CU 1000 into sub-CUs 1001 and obtain the motion vectors as well as the reference indices of each sub-CU from the block corresponding to each sub-CU.

In the first step, a reference picture 1050 and the corresponding block is determined by the motion information of the spatial neighboring blocks of the current CU 1000. To avoid the repetitive scanning process of neighboring blocks, the first merge candidate in the merge candidate list of the current CU 1000 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 1051 is identified by the temporal vector in the motion source picture 1050, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1-X) for each sub-CU.

2.1.2 Examples of Spatial-Temporal Motion Vector Prediction (STMVP)

Figure 11:
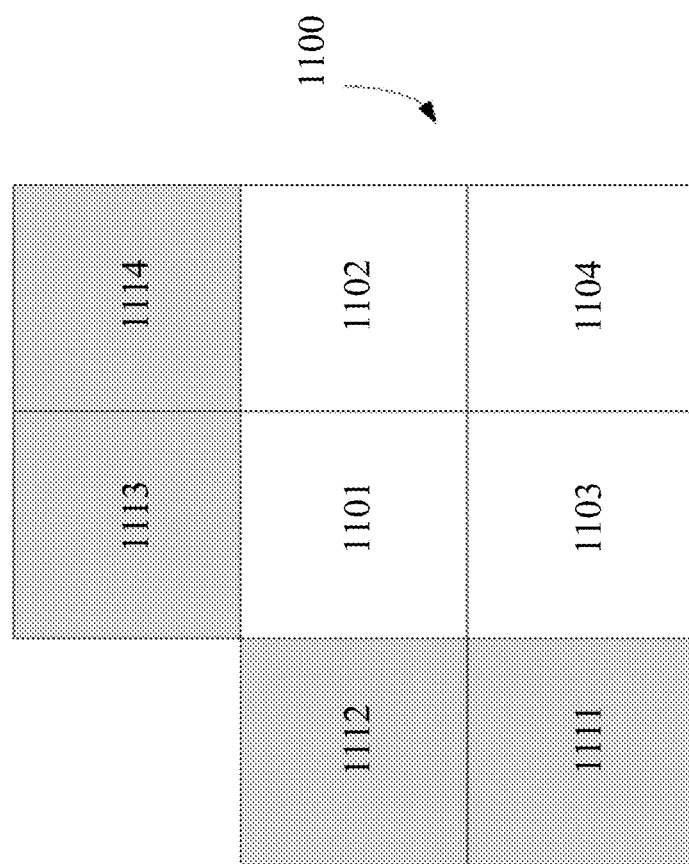
FIG. 11 shows an example of a coding unit (CU) with sub-blocks and neighboring blocks used by the spatial-temporal motion vector prediction (STMVP) algorithm.

In the STMVP method, the motion vectors of the sub-CUs are derived recursively, following raster scan order. FIG. 11 shows an example of one CU with four sub-blocks and neighboring blocks. Consider an 8×8 CU 1100 that includes four 4×4 sub-CUs A (1101), B (1102), C (1103), and D (1104). The neighboring 4×4 blocks in the current frame are labelled as a (1111), b (1112), c (1113), and d (1114).

The motion derivation for sub-CU A starts by identifying its two spatial neighbors. The first neighbor is the N×N block above sub-CU A 1101 (block c 1113). If this block c (1113) is not available or is intra coded the other N×N blocks above sub-CU A (1101) are checked (from left to right, starting at block c 1113). The second neighbor is a block to the left of the sub-CU A 1101 (block b 1112). If block b (1112) is not available or is intra coded other blocks to the left of sub-CU A 1101 are checked (from top to bottom, staring at block b 1112). The motion information obtained from the neighboring blocks for each list is scaled to the first reference frame for a given list. Next, temporal motion vector predictor (TMVP) of sub-block A 1101 is derived by following the same procedure of TMVP derivation as specified in HEVC. The motion information of the collocated block at block D 1104 is fetched and scaled accordingly. Finally, after retrieving and scaling the motion information, all available motion vectors are averaged separately for each reference list. The averaged motion vector is assigned as the motion vector of the current sub-CU.

2.1.3 Examples of Sub-CU Motion Prediction Mode Signaling

In some embodiments, the sub-CU modes are enabled as additional merge candidates and there is no additional syntax element required to signal the modes. Two additional merge candidates are added to merge candidates list of each CU to represent the ATMVP mode and STMVP mode. In other embodiments, up to seven merge candidates may be used, if the sequence parameter set indicates that ATMVP and STMVP are enabled. The encoding logic of the additional merge candidates is the same as for the merge candidates in the HM, which means, for each CU in P or B slice, two more RD checks may be needed for the two additional merge candidates. In some embodiments, e.g., JEM, all bins of the merge index are context coded by CABAC (Context-based Adaptive Binary Arithmetic Coding). In other embodiments, e.g., HEVC, only the first bin is context coded and the remaining bins are context by-pass coded.

2.2 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM:

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

Figure 12:
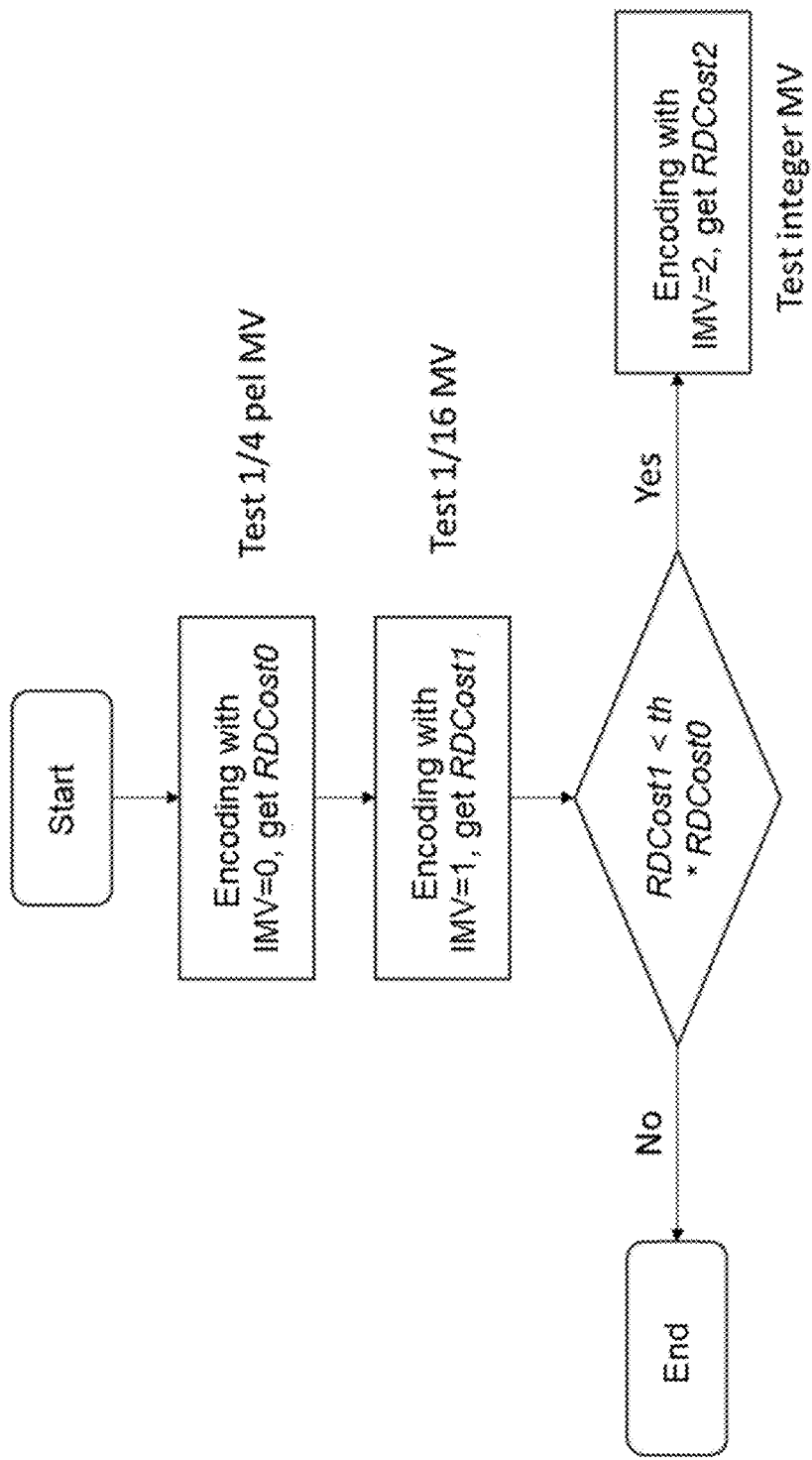
FIG. 12 shows an example flowchart for encoding with different MV precisions.

The encoding process is shown in FIG. 12. First, ¼ pel MV is tested and the RD cost is calculated and denoted as RDCost0, then integer MV is tested and the RD cost is denoted as RDCost1. If RDCost1<th * RDCost0 (wherein th is a positive valued threshold), then 4-pel MV is tested; otherwise, 4-pel MV is skipped. Basically, motion information and RD cost etc. are already known for ¼ pel MV when checking integer or 4-pel MV, which can be reused to speed up the encoding process of integer or 4-pel MV.

2.3 Examples of Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to 1/16 pel. The higher motion vector accuracy (1/16 pel) is used in motion compensation inter prediction for the CU coded with skip/merge mode. For the CU coded with normal AMVP mode, either the integer-pel or quarter-pel motion is used.

SHVC upsampling interpolation filters, which have same filter length and normalization factor as HEVC motion compensation interpolation filters, are used as motion compensation interpolation filters for the additional fractional pel positions. The chroma component motion vector accuracy is 1/32 sample in the JEM, the additional interpolation filters of 1/32 pel fractional positions are derived by using the average of the filters of the two neighbouring 1/16 pel fractional positions.

2.4 Example of the Triangular Prediction Unit Mode

Figures 13A, 13B:
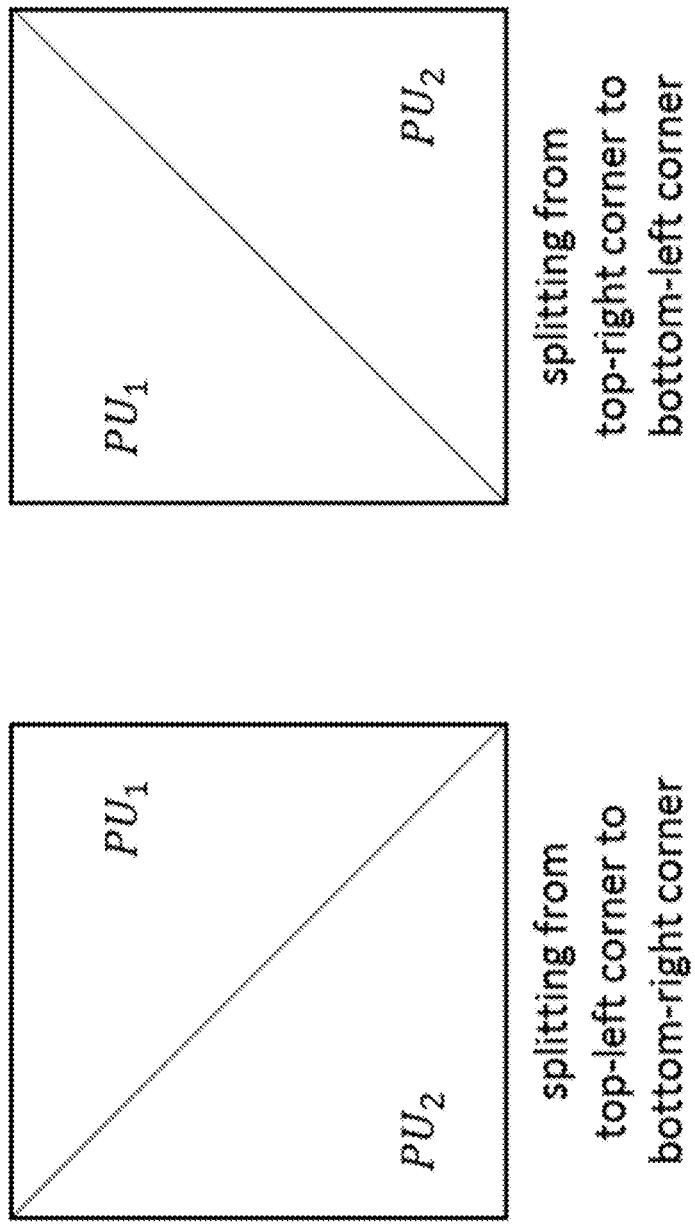
FIGS. 13A and 13B show examples of splitting a coding unit (CU) into two triangular prediction units (PUs).

The concept of the triangular prediction unit mode is to introduce a new triangular partition for motion compensated prediction. As shown in FIGS. 13A and 13B, the triangular prediction unit mode splits a CU into two triangular prediction units, in either diagonal or inverse diagonal direction. Each triangular prediction unit in the CU is inter-predicted using its own uni-prediction motion vector and reference frame index which are derived from a uni-prediction candidate list. An adaptive weighting process is performed to the diagonal edge after predicting the triangular prediction units. Then, the transform and quantization process are applied to the whole CU. It is noted that this mode is only applied to skip and merge modes.

2.4.1 Uni-Prediction Candidate List

Figure 14:
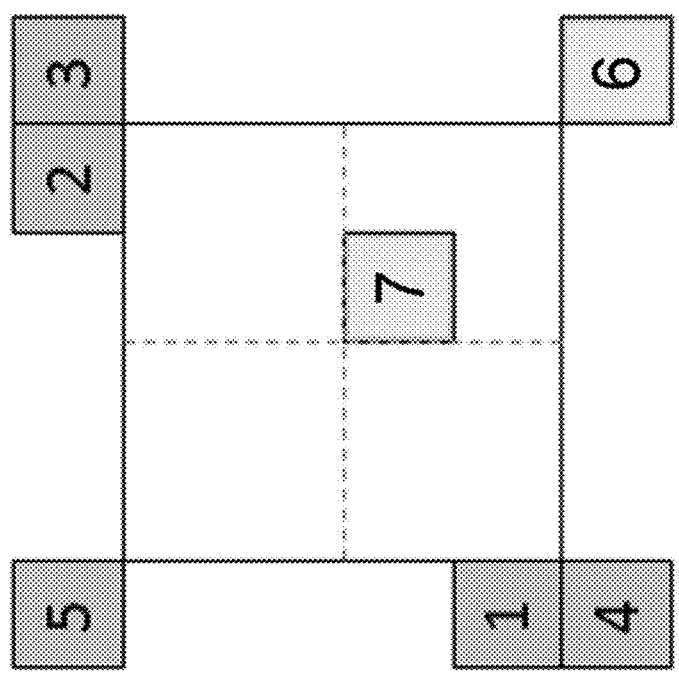
FIG. 14 shows an example of the positions of neighboring blocks.

The uni-prediction candidate list consists of five uni-prediction motion vector candidates. It is derived from seven neighboring blocks including five spatial neighboring blocks (1 to 5) and two temporal co-located blocks (6 to 7), as shown in FIG. 14. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list.

2.4.2 Adaptive Weighting Process

After predicting each triangular prediction unit, an adaptive weighting process is applied to the diagonal edge between the two triangular prediction units to derive the final prediction for the whole CU. Two weighting factor groups are listed as follows:

$1^{st}$ weighting factor group: {7/8, 6/8, 4/8, 2/8, 1/8} and {7/8, 4/8, 1/8} are used for the luminance and the chrominance samples, respectively; and $2^{nd}$ weighting factor group: {7/8, 6/8, 5/8, 4/8, 3/8, 2/8, 1/8} and {6/8, 4/8, 2/8} are used for the luminance and the chrominance samples, respectively.

Figure 15:
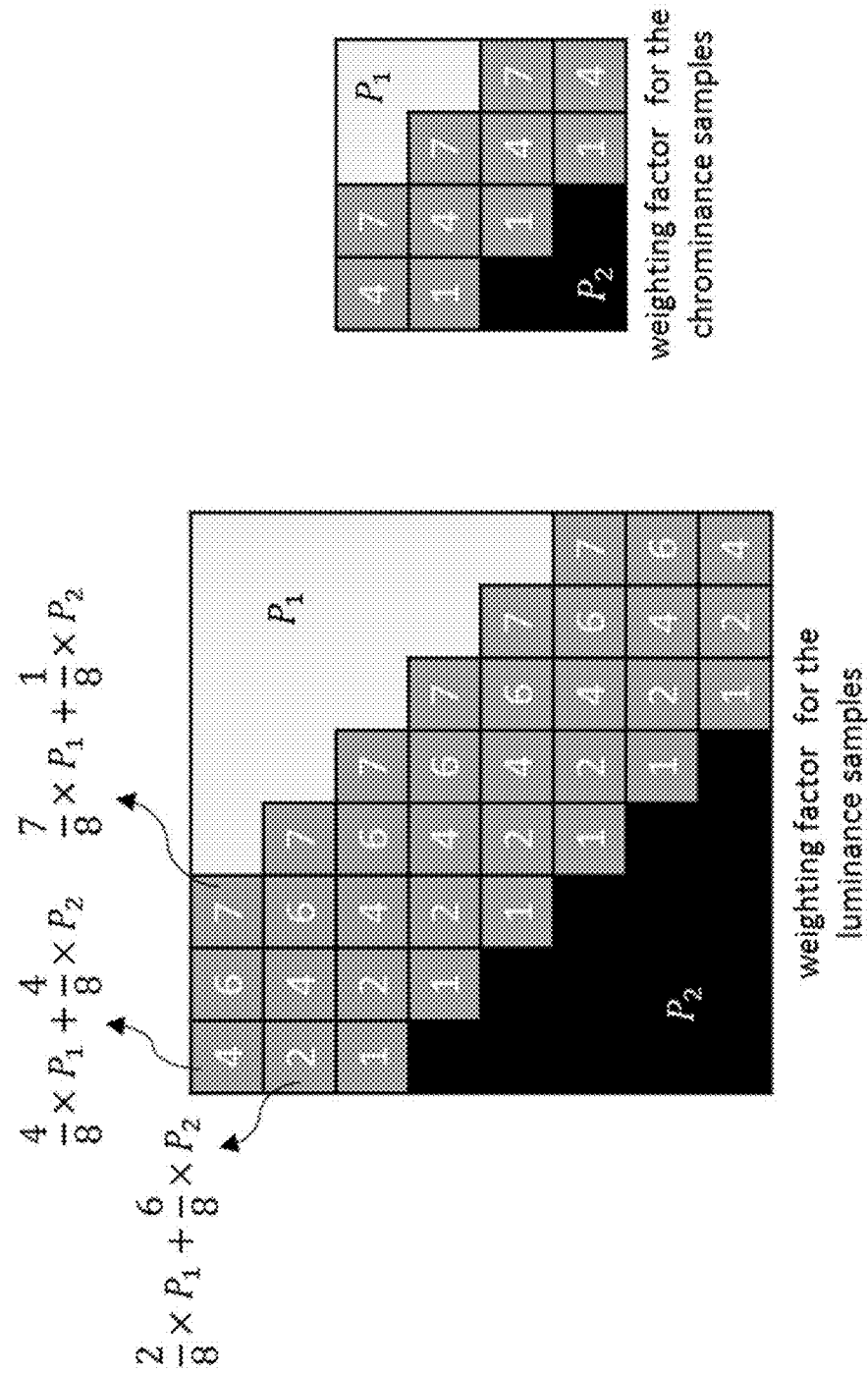
FIG. 15 shows an example of a CU applying the $1^{st}$ weighting factor group.

One weighting factor group is selected based on the comparison of the motion vectors of two triangular prediction units. The $2^{nd}$ weighting factor group is used when the reference pictures of the two triangular prediction units are different from each other or their motion vector difference is larger than 16 pixels. Otherwise, the $1^{st}$ weighting factor group is used. FIG. 15 shows an example of this adaptive weighting process.

2.4.3 Motion Vector Storage

Figure 16:
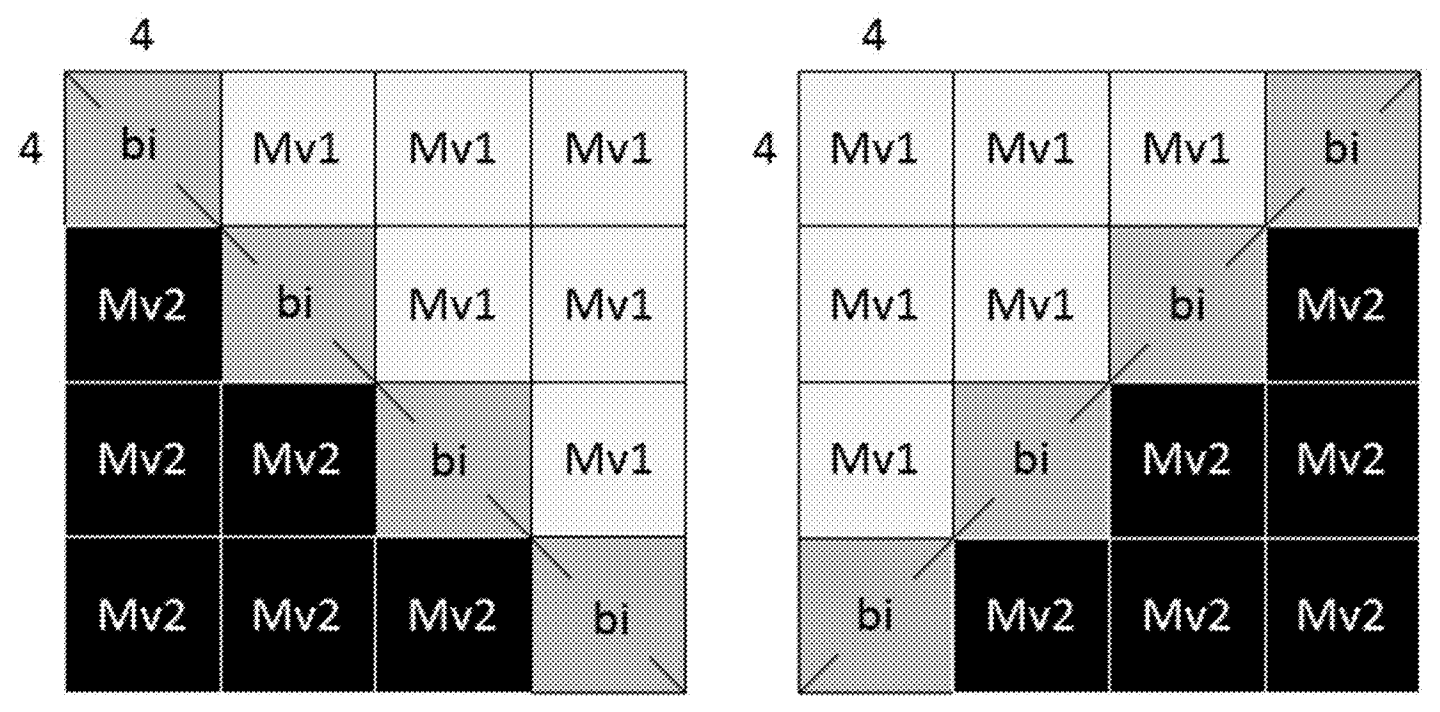

The motion vectors (Mv1 and Mv2 in FIG. 16) of the triangular prediction units are stored in 4×4 grids. For each 4×4 grid, either uni-prediction or bi-prediction motion vector is stored depending on the position of the 4×4 grid in the CU. As shown in FIG. 16, uni-prediction motion vector, either Mv1 or Mv2, is stored for the 4×4 grid located in the non-weighted area. On the other hand, a bi-prediction motion vector is stored for the 4×4 grid located in the weighted area. The bi-prediction motion vector is derived from Mv1 and Mv2 according to the following rules:

1) In the case that Mv1 and Mv2 have motion vector from different directions (L0 or L1), Mv1 and Mv2 are simply combined to form the bi-prediction motion vector.

2) In the case that both Mv1 and Mv2 are from the same L0 (or L1) direction:

2a) If the reference picture of Mv2 is the same as a picture in the L1 (or L0) reference picture list, Mv2 is scaled to the picture. Mv1 and the scaled Mv2 are combined to form the bi-prediction motion vector.

2b) If the reference picture of Mv1 is the same as a picture in the L1 (or L0) reference picture list, Mv1 is scaled to the picture. The scaled Mv1 and Mv2 are combined to form the bi-prediction motion vector.

2c) Otherwise, only Mv1 is stored for the weighted area.

2.5 Examples of Overlapped Block Motion Compensation (OBMC)

In the JEM, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, an MC block corresponds to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as shown in FIGS. 17A and 17B.

Figure 17A:
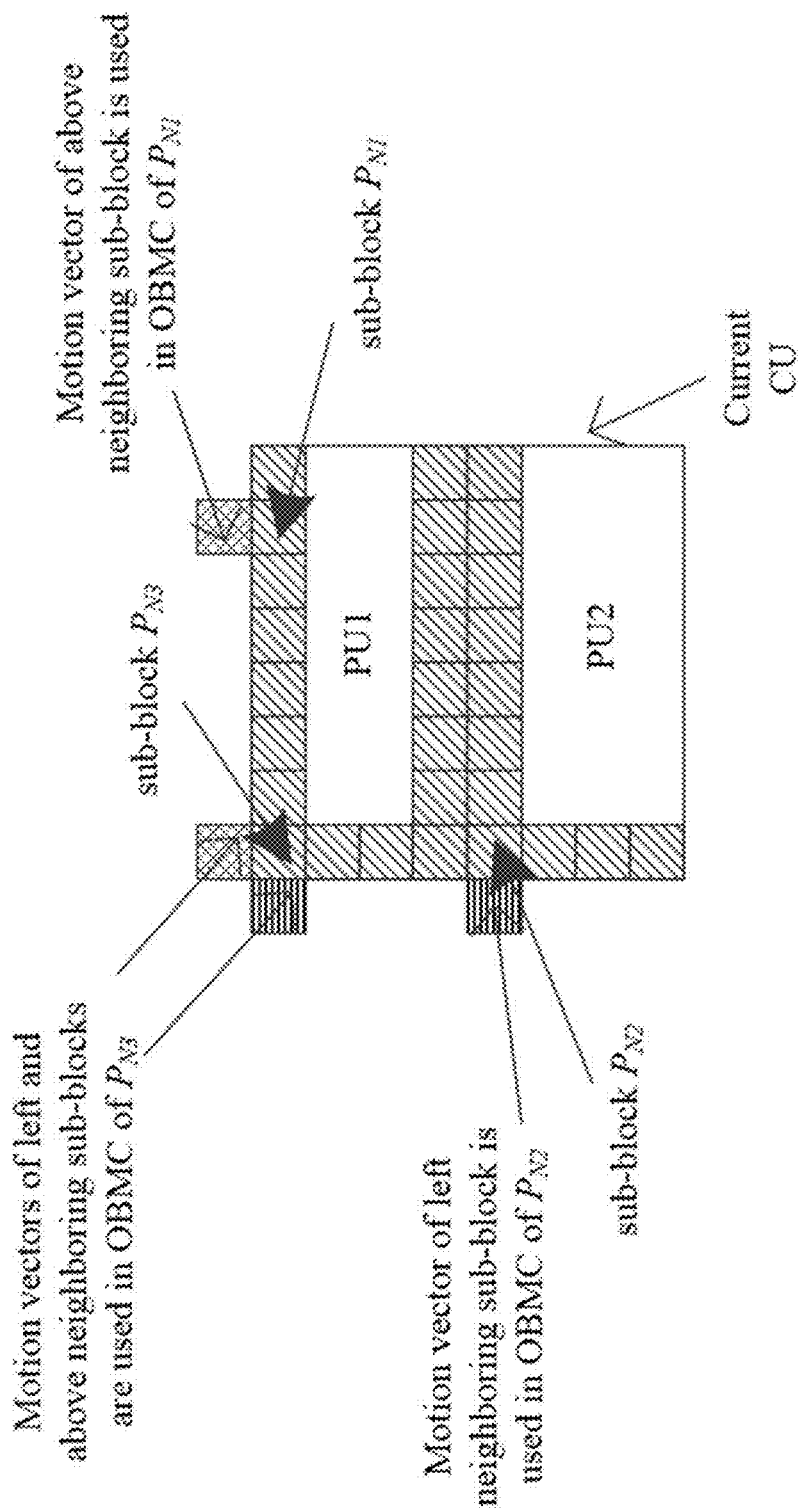
FIGS. 17A and 17B show example snapshots of sub-block when using the overlapped block motion compensation (OBMC) algorithm.
Figure 17B:
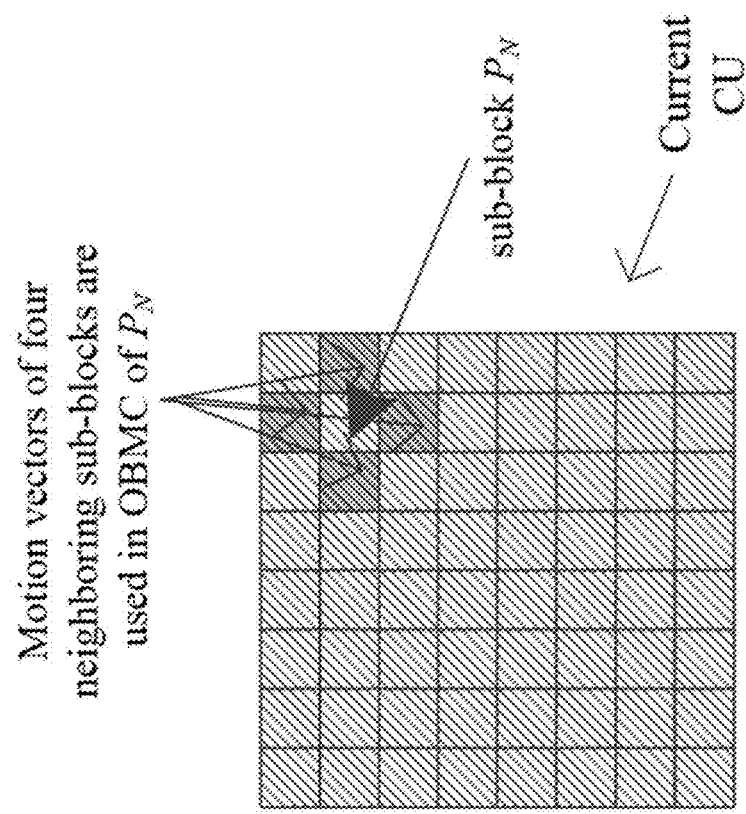

FIG. 17A shows sub-blocks at the CU/PU boundary, and the hatched sub-blocks are where OBMC applies. Similarly, FIG. 17B shows the sub-PUs in ATMVP mode.

When OBMC applies to the current sub-block, besides current motion vectors, motion vectors of four connected neighboring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighboring sub-block is denoted as PN, with N indicating an index for the neighboring above, below, left and right sub-blocks and prediction block based on motion vectors of the current sub-block is denoted as PC. When PN is based on the motion information of a neighboring sub-block that contains the same motion information to the current sub-block, the OBMC is not performed from PN. Otherwise, every sample of PN is added to the same sample in PC, i.e., four rows/columns of PN are added to PC. The weighting factors {1/4, 1/8, 1/16, 1/32} are used for PN and the weighting factors {3/4, 7/8, 15/16, 31/32} are used for PC. The exception are small MC blocks, (i.e., when height or width of the coding block is equal to 4 or a CU is coded with sub-CU mode), for which only two rows/columns of PN are added to PC. In this case weighting factors {1/4, 1/8} are used for PN and weighting factors {3/4, 7/8} are used for PC. For PN generated based on motion vectors of vertically (horizontally) neighboring sub-block, samples in the same row (column) of PN are added to PC with a same weighting factor.

In the JEM, for a CU with size less than or equal to 256 luma samples, a CU level flag is signaled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighboring block and the left neighboring block is used to compensate the top and left boundaries of the original signal of the current CU, and then the normal motion estimation process is applied.

2.6 Examples of Local Illumination Compensation (LIC)

LIC is based on a linear model for illumination changes, using a scaling factor a and an offset b. And it is enabled or disabled adaptively for each inter-mode coded coding unit (CU).

Figure 18:
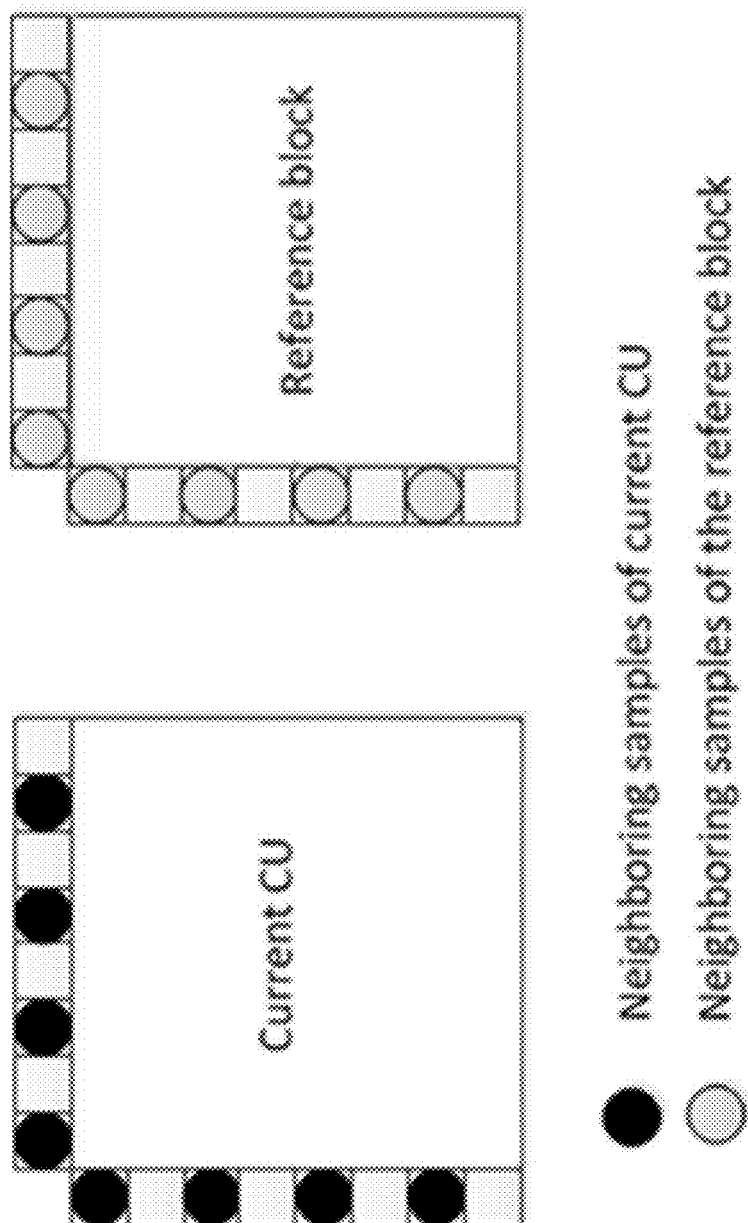
FIG. 18 shows an example of neighboring samples used to derive parameters for the local illumination compensation (LIC) algorithm.

When LIC applies for a CU, a least square error method is employed to derive the parameters a and b by using the neighboring samples of the current CU and their corresponding reference samples. FIG. 18 shows an example of neighboring samples used to derive parameters of the IC algorithm. Specifically, and as shown in FIG. 18, the subsampled (2:1 subsampling) neighboring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

When LIC is enabled for a picture, an additional CU level RD check is needed to determine whether LIC is applied or not for a CU. When LIC is enabled for a CU, the mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM:

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.7 Examples of Affine Motion Compensation Prediction

In HEVC, only a translation motion model is applied for motion compensation prediction (MCP). However, the camera and objects may have many kinds of motion, e.g. zoom in/out, rotation, perspective motions, and/or other irregular motions. JEM, on the other hand, applies a simplified affine transform motion compensation prediction. FIG. 19A shows an example of an affine motion field of a block 1900 described by two control point motion vectors $V_0$ and $V_1$. The motion vector field (MVF) of the block 1900 can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad \text{Eq. (1a)}$$

As shown in FIG. 19A, $(v_{0x}, v_{0y})$ is motion vector of the top-left corner control point, and $(v_{1x}, v_{1y})$ is motion vector of the top-right corner control point. Similarly, the MVF of the block, for the 6-parameter affine model, can be described by:

$$\begin{cases} v_x = \frac{v_{1x} - v_{0x}}{w}x + \frac{v_{2x} - v_{0x}}{h}y + v_{0x} \\ v_y = \frac{v_{1y} - v_{0y}}{w}x + \frac{v_{2y} - v_{0y}}{h}y + v_{0y} \end{cases} \quad \text{Eq. (1b)}$$

Figure 19B:
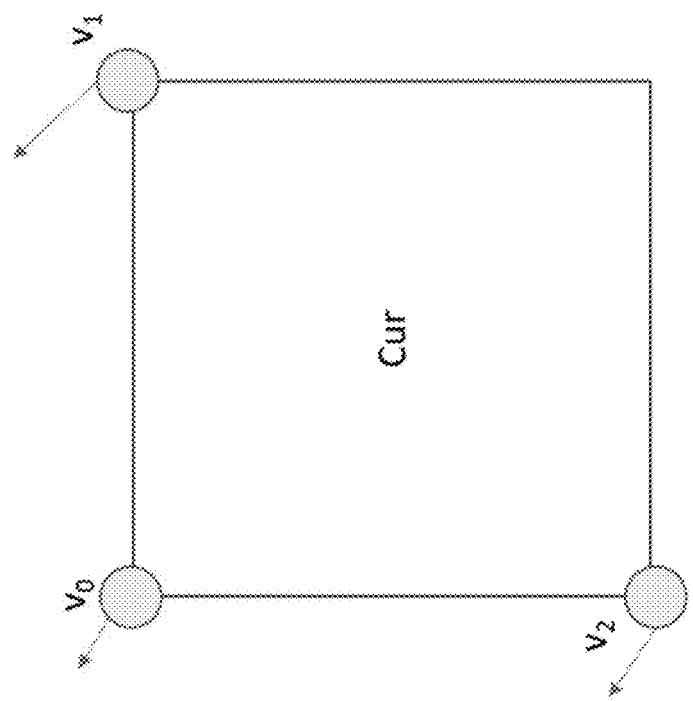
FIGS. 19A and 19B show examples of a simplified 4-parameter and 6-parameter affine motion model, respectively.
Figure 19A:
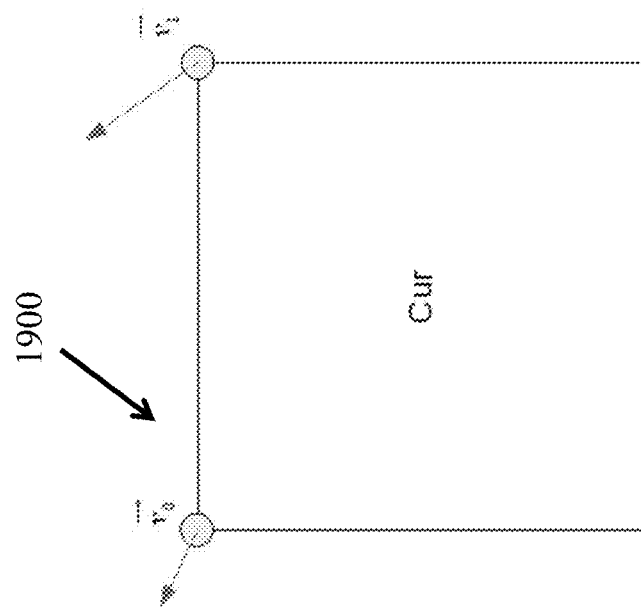

Herein, and as shown in FIG. 19B, $(v_{0x}, v_{0y})$ is motion vector of the top-left corner control point, and $(v_{1x}, v_{1y})$ is motion vector of the top-right corner control point and $(v_{2x}, v_{2y})$ is motion vector of the bottom-left corner control point, (x, y) represents the coordinate of a representative point relative to the top-left sample within current block. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2).

To simplify the motion compensation prediction, sub-block based affine transform prediction can be applied. The sub-block size MxN is derived as follows:

$$\begin{cases} M = \text{clip3}\left(4, w, \frac{w \times MvPre}{\max(\text{abs}(v_{1x} - v_{0x}), \text{abs}(v_{1y} - v_{0y}))}\right) \\ N = \text{clip3}\left(4, h, \frac{h \times MvPre}{\max(\text{abs}(v_{2x} - v_{0x}), \text{abs}(v_{2y} - v_{0y}))}\right) \end{cases} \quad \text{Eq. (2)}$$

Here, MvPre is the motion vector fraction accuracy (e.g., 1/16 in JEM). $(v_{2x}, v_{2y})$ is motion vector of the bottom-left control point, calculated according to Eq. (1). M and N can be adjusted downward if necessary to make it a divisor of w and h, respectively.

Figure 20:
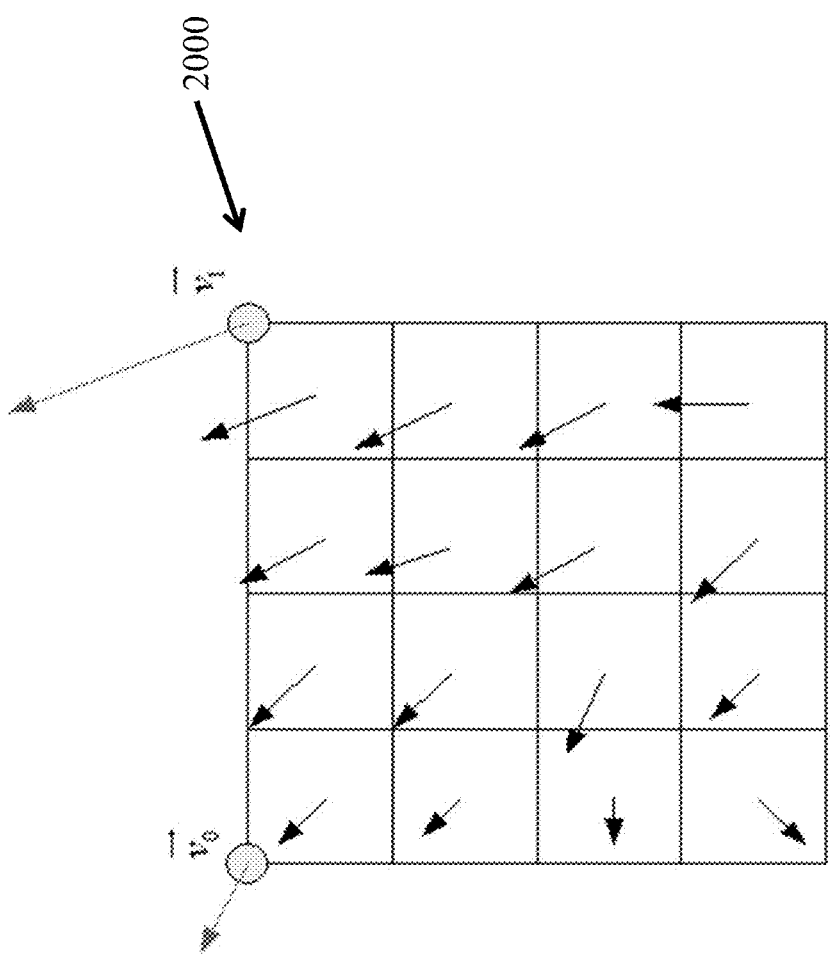
FIG. 20 shows an example of an affine motion vector field (MVF) per sub-block.

FIG. 20 shows an example of affine MVF per sub-block for a block 2000. To derive motion vector of each MxN sub-block, the motion vector of the center sample of each sub-block can be calculated according to Eq. (1a), and rounded to the motion vector fraction accuracy (e.g., 1/16 in JEM). Then the motion compensation interpolation filters can be applied to generate the prediction of each sub-block with derived motion vector. After the MCP, the high accuracy motion vector of each sub-block is rounded and saved as the same accuracy as the normal motion vector.

2.7.1 Examples of AF_INTER Mode

In the JEM, there are two affine motion modes: AF_INTER mode and AF_MERGE mode. For CUs with both width and height larger than 8, AF_INTER mode can be applied. An affine flag in CU level is signaled in the bitstream to indicate whether AF_INTER mode is used. In the AF_INTER mode, a candidate list with motion vector pair $\{(v_0, v_1)|v_0=\{V_A, V_B, V_C\}, v_1=\{V_D, V_E\}\}$ is constructed using the neighboring blocks.

Figure 21:
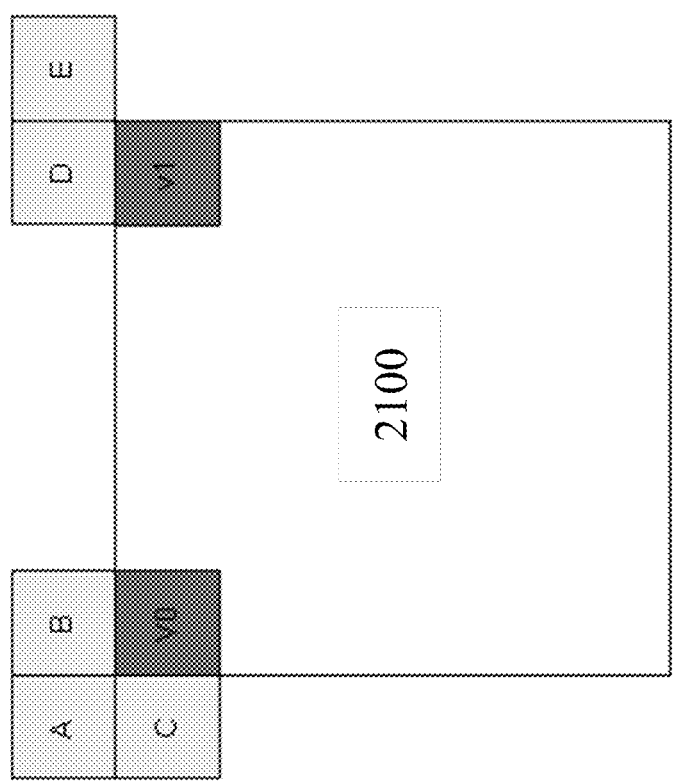
FIG. 21 shows an example of motion vector prediction (MVP) for the AF_INTER affine motion mode.
Figure 22B:
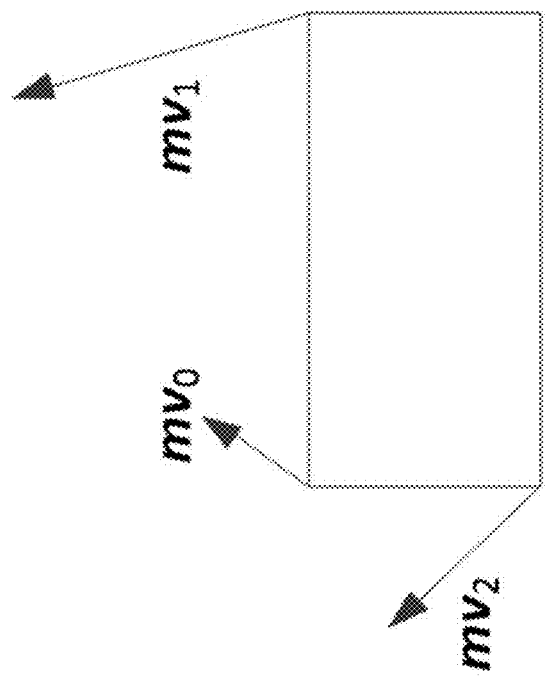
FIGS. 22A and 22B show examples of the 4-parameter and 6-parameter affine models, respectively.
Figure 22A:
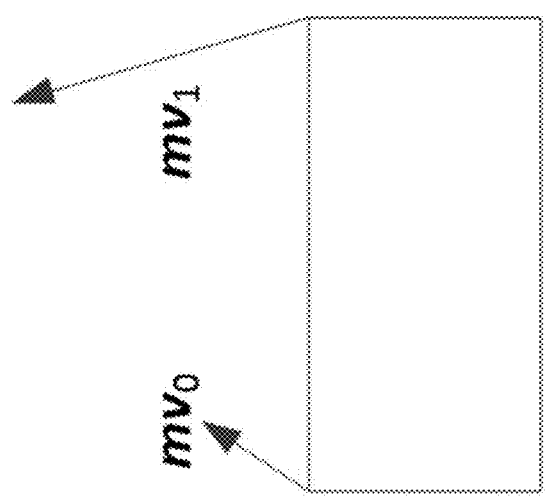

FIG. 21 shows an example of motion vector prediction (MVP) for a block 1700 in the AF_INTER mode. As shown in FIG. 21, $v_0$ is selected from the motion vectors of the sub-block A, B, or C. The motion vectors from the neighboring blocks can be scaled according to the reference list. The motion vectors can also be scaled according to the relationship among the Picture Order Count (POC) of the reference for the neighboring block, the POC of the reference for the current CU, and the POC of the current CU. The approach to select $v_1$ from the neighboring sub-block D and E is similar. If the number of candidate list is smaller than 2, the list is padded by the motion vector pair composed by duplicating each of the AMVP candidates. When the candidate list is larger than 2, the candidates can be firstly sorted according to the neighboring motion vectors (e.g., based on the similarity of the two motion vectors in a pair candidate). In some implementations, the first two candidates are kept.

In some embodiments, a Rate Distortion (RD) cost check is used to determine which motion vector pair candidate is selected as the control point motion vector prediction (CPMVP) of the current CU. An index indicating the position of the CPMVP in the candidate list can be signaled in the bitstream. After the CPMVP of the current affine CU is determined, affine motion estimation is applied and the control point motion vector (CPMV) is found. Then the difference of the CPMV and the CPMVP is signaled in the bitstream.

In AF_INTER mode, when 4/6 parameter affine mode is used, 2/3 control points are required, and therefore 2/3 MVD needs to be coded for these control points, as shown in FIGS.

22A and 22B. In an existing implementation, the MV may be derived as follows, e.g., it predicts $mvd_1$ and $mvd_2$ from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Herein, $\overline{mv}_i$, $mvd_i$ and $mv_i$ are the predicted motion vector, motion vector difference and motion vector of the top-left pixel (i=0), top-right pixel (i=1) or left-bottom pixel (i=2) respectively, as shown in FIG. 18B. In some embodiments, the addition of two motion vectors (e.g., mvA(xA, yA) and mvB(xB, yB)) is equal to summation of two components separately. For example, newMV=mvA+mvB implies that the two components of newMV are set to (xA+xB) and (yA+yB), respectively.

2.7.2 Examples of Fast Affine ME Algorithms in AF_INTER Mode

In some embodiments of the affine mode, MV of 2 or 3 control points needs to be determined jointly. Directly searching the multiple MVs jointly is computationally complex. In an example, a fast affine ME algorithm is proposed and is adopted into VTM/BMS.

For example, the fast affine ME algorithm is described for the 4-parameter affine model, and the idea can be extended to 6-parameter affine model:

$$\begin{cases} x' = ax + by + c \\ y' = -bx + ay + d \end{cases} \quad \text{Eq. (3)}$$

$$\begin{cases} mv^h_{(x,y)} = x' - x = (a-1)x + by + c \\ mv^v_{(x,y)} = y' - y = -bx + (a-1)y + d \end{cases} \quad \text{Eq. (4)}$$

Replacing (a-1) with a' enables the motion vectors to be rewritten as:

$$\begin{cases} mv^h_{(x,y)} = x' - x = a'x + by + c \\ mv^v_{(x,y)} = y' - y = -bx + a'y + d \end{cases} \quad \text{Eq. (5)}$$

If it is assumed that the motion vectors of the two controls points (0, 0) and (0, w) are known, from Equation (5) the affine parameters may be derived as:

$$\begin{cases} c = mv^h_{(0,0)} \\ d = mv^v_{(0,0)} \end{cases} \quad \text{Eq. (6)}$$

The motion vectors can be rewritten in vector form as:

$$MV(p) = A(P) * MV_C^T \quad \text{Eq. (7)}$$

Herein, P=(x, y) is the pixel position, $$A(P) = \begin{bmatrix} 1 & x & 0 & y \\ 0 & y & 1 & -x \end{bmatrix}, \text{ and} \quad \text{Eq. (8)}$$

$$MV_C = [\,mv^h_{(0,0)} \quad a \quad mv^v_{(0,0)} \quad b\,]. \quad \text{Eq. (9)}$$

In some embodiments, and at the encoder, the MVD of AF_INTER may be derived iteratively. Denote $MV^i(P)$ as the MV derived in the ith iteration for position P and denote $dMV_C^i$ as the delta updated for $MV_C$ in the ith iteration. Then in the (i+1)th iteration, $$\begin{aligned} MV^{i+1}(P) &= A(P) * ((MV_C^i)^T + (dMV_C^i)^T) \\ &= A(P) * (MV_C^i)^T + A(P) * (dMV_C^i)^T \\ &= MV^i(P) + A(P) * (dMV_C^i)^T. \end{aligned} \quad \text{Eq. (10)}$$

Denote $Pic_{ref}$ as the reference picture and denote $Pic_{cur}$ as the current picture and denote $Q = P + MV^i(P)$. If the MSE is used as the matching criterion, then the function that needs to be minimized may be written as:

$$\begin{aligned} \min \sum_P (Pic_{cur}(P) - Pic_{ref}(P + MV^{i+1}(P)))^2 &= \\ \min \sum_P \left( Pic_{cur}(P) - Pic_{ref}(Q + A(P) * (dMV_C^i)^T) \right)^2 \end{aligned} \quad \text{Eq. (11)}$$

If it is assumed that $(dMV_C^i)^T$ is small enough, $Pic_{ref}(Q + A(P) * (dMV_C^i)^T)$ may be rewritten, as an approximation based on a 1-st order Taylor expansion, as:

$$Pic_{ref}(Q + A(P) * (dMV_C^i)^T) \approx Pic_{ref}(Q) + Pic'_{ref}(Q) * A(P) * (dMV_C^i)^T. \quad (12)$$

Herein, $$Pic'_{ref}(Q) = \left[\frac{dPic_{ref}(Q)}{dx} \quad \frac{dPic_{ref}(Q)}{dy}\right].$$

If the notation $E^{i+1}(P) = Pic_{cur}(P) - Pic_{ref}(Q)$ is adopted, then:

$$\begin{aligned} \min \sum_P \left( \begin{array}{c} Pic_{cur}(P) - Pic_{ref}(Q) - \\ Pic'_{ref}(Q) * A(P) * (dMV_C^i)^T \end{array} \right)^2 &= \\ \min \sum_P \left( E^{i+1}(P) - Pic'_{ref}(Q) * A(P) * (dMV_C^i)^T \right)^2 \end{aligned} \quad \text{Eq. (13)}$$

The term $dMV_C^i$ may be derived by setting the derivative of the error function to zero, and then computing delta MV of the control points (0, 0) and (0, w) according to $A(P) * (dMV_C^i)^T$, as follows:

$$dMV_{(0,0)}^h = dMV_C^i[0] \quad \text{Eq. (14)}$$

$$dMV_{(0,w)}^h = dMV_C^i[1] * w + dMV_C^i[2] \quad \text{Eq. (15)}$$

$$dMV_{(0,0)}^v = dMV_C^i[2] \quad \text{Eq. (16)}$$

$$dMV_{(0,w)}^v = -dMV_C^i[3] * w + dMV_C^i[2] \quad \text{Eq. (17)}$$

In some embodiments, this MVD derivation process may be iterated n times, and the final MVD may be calculated as follows:

$$fdMV_{(0,0)}^h = \Sigma_{i=0}^{n-1} dMV_C^i[0] \quad \text{Eq. (18)}$$

$$fdMV_{(0,w)}^h = \Sigma_{i=0}^{n-1} dMV_C^i[1] * w + \Sigma_{i=0}^{n-1} dMV_C^i[0] \quad \text{Eq. (19)}$$

$$fdMV_{(0,0)}^v = \Sigma_{i=0}^{n-1} dMV_C^i[2] \quad \text{Eq. (20)}$$

$$fdMV_{(0,w)}^v = \Sigma_{i=0}^{n-1} -dMV_C^i[3] * w + \Sigma_{i=0}^{n-1} dMV_C^i[2] \quad \text{Eq. (21)}$$

In the aforementioned implementation, predicting delta MV of control point (0, w), denoted by mvdi from delta MV of control point (0, 0), denoted by $mvd_0$, results in only ($\Sigma_{i=0}^{n-1}$ $dMV_C^i[1]*w$, $-\Sigma_{i=0}^{n-1}$-$dMV_C^i[3]*w$) being encoded for $mvd_1$.

2.7.3 Examples of AF_MERGE Mode

Figures 23A, 23B:
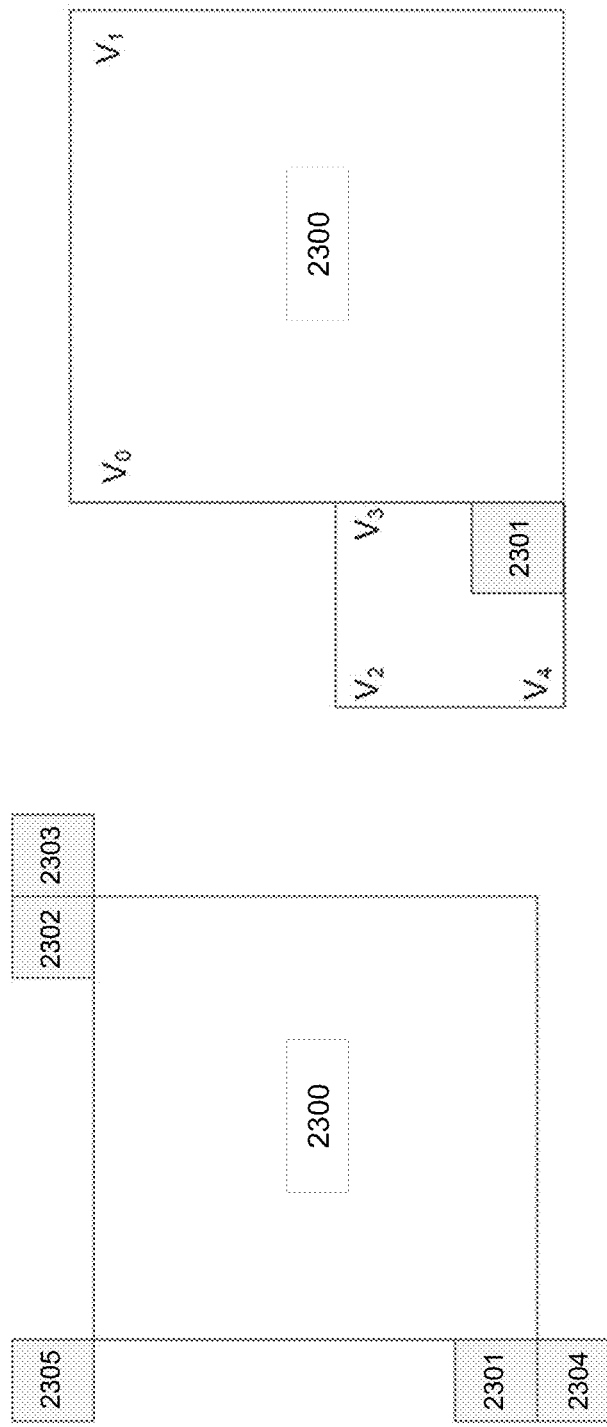
FIGS. 23A and 23B show example candidates for the AF_MERGE affine motion mode.

When a CU is applied in AF_MERGE mode, it gets the first block coded with an affine mode from the valid neighboring reconstructed blocks. FIG. 23A shows an example of the selection order of candidate blocks for a current CU 2300. As shown in FIG. 23A, the selection order can be from left (2301), above (2302), above right (2303), left bottom (2304) to above left (2305) of the current CU 2300. FIG. 23B shows another example of candidate blocks for a current CU 2300 in the AF_MERGE mode. If the neighboring left bottom block 2301 is coded in affine mode, as shown in FIG. 23B, the motion vectors $v_2$, $v_3$ and $v_4$ of the top left corner, above right corner, and left bottom corner of the CU containing the sub-block 2301 are derived. The motion vector $v_0$ of the top left corner on the current CU 1900 is calculated based on v2, v3 and v4. The motion vector v1 of the above right of the current CU can be calculated accordingly.

After the CPMV of the current CU v0 and v1 are computed according to the affine motion model in Eq. (1a), the MVF of the current CU can be generated. In order to identify whether the current CU is coded with AF_MERGE mode, an affine flag can be signaled in the bitstream when there is at least one neighboring block is coded in affine mode.

In some embodiments, an affine merge candidate list may be constructed with following steps:

1) Insert inherited affine candidates

Figure 24:
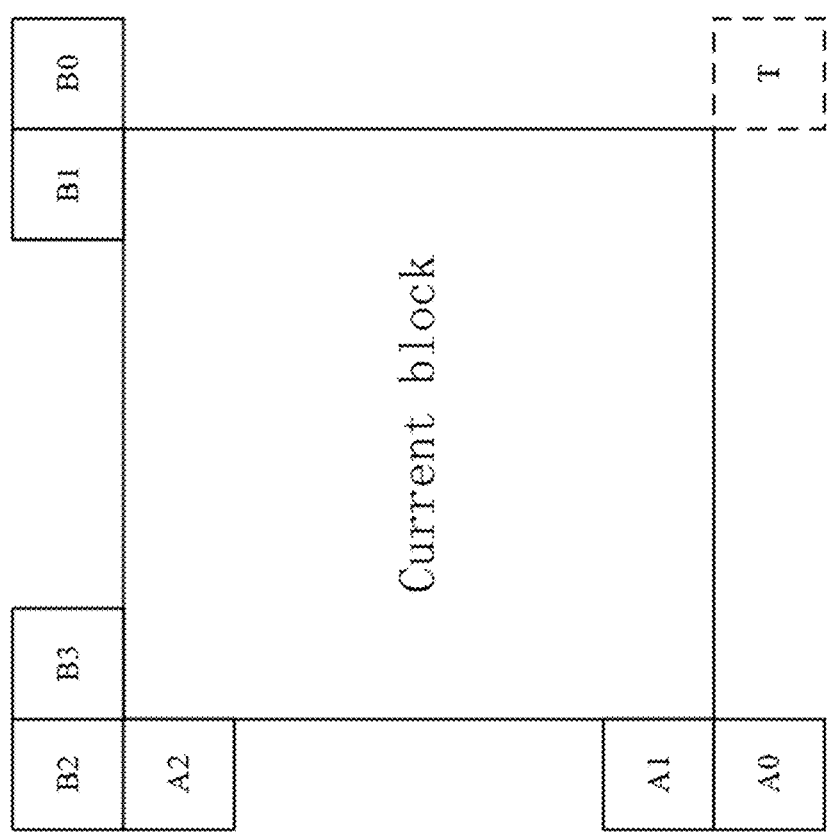
FIG. 24 shows an example of candidate positions for affine merge mode.

Inherited affine candidate means that the candidate is derived from the affine motion model of its valid neighbor affine coded block. In the common base, as shown in FIG. 24, the scan order for the candidate positions is: A1, B1, B0, A0 and B2.

After a candidate is derived, full pruning process is performed to check whether same candidate has been inserted into the list. If a same candidate exists, the derived candidate is discarded.

2) Insert constructed affine candidates

If the number of candidates in affine merge candidate list is less than MaxNumAffineCand (set to 5 in this contribution), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 24. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.
For CP3, the checking priority is A1→A0.
For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

3) Padding with zero motion vectors

If the number of candidates in affine merge candidate list is less than 5, zero motion vectors with zero reference indices are insert into the candidate list, until the list is full.

2.8 Examples of Pattern Matched Motion Vector Derivation (PMMVD)

The PMMVD mode is a special merge mode based on the Frame-Rate Up Conversion (FRUC) method. With this mode, motion information of a block is not signaled but derived at decoder side.

A FRUC flag can be signaled for a CU when its merge flag is true. When the FRUC flag is false, a merge index can be signaled and the regular merge mode is used. When the FRUC flag is true, an additional FRUC mode flag can be signaled to indicate which method (e.g., bilateral matching or template matching) is to be used to derive motion information for the block.

At the encoder side, the decision on whether using FRUC merge mode for a CU is based on RD cost selection as done for normal merge candidate. For example, multiple matching modes (e.g., bilateral matching and template matching) are checked for a CU by using RD cost selection. The one leading to the minimal cost is further compared to other CU modes. If a FRUC matching mode is the most efficient one, FRUC flag is set to true for the CU and the related matching mode is used.

Typically, motion derivation process in FRUC merge mode has two steps: a CU-level motion search is first performed, then followed by a Sub-CU level motion refinement. At CU level, an initial motion vector is derived for the whole CU based on bilateral matching or template matching. First, a list of MV candidates is generated and the candidate that leads to the minimum matching cost is selected as the starting point for further CU level refinement. Then a local search based on bilateral matching or template matching around the starting point is performed. The MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in Eq. (3), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \quad \text{Eq. (22)}$$

Figure 25:
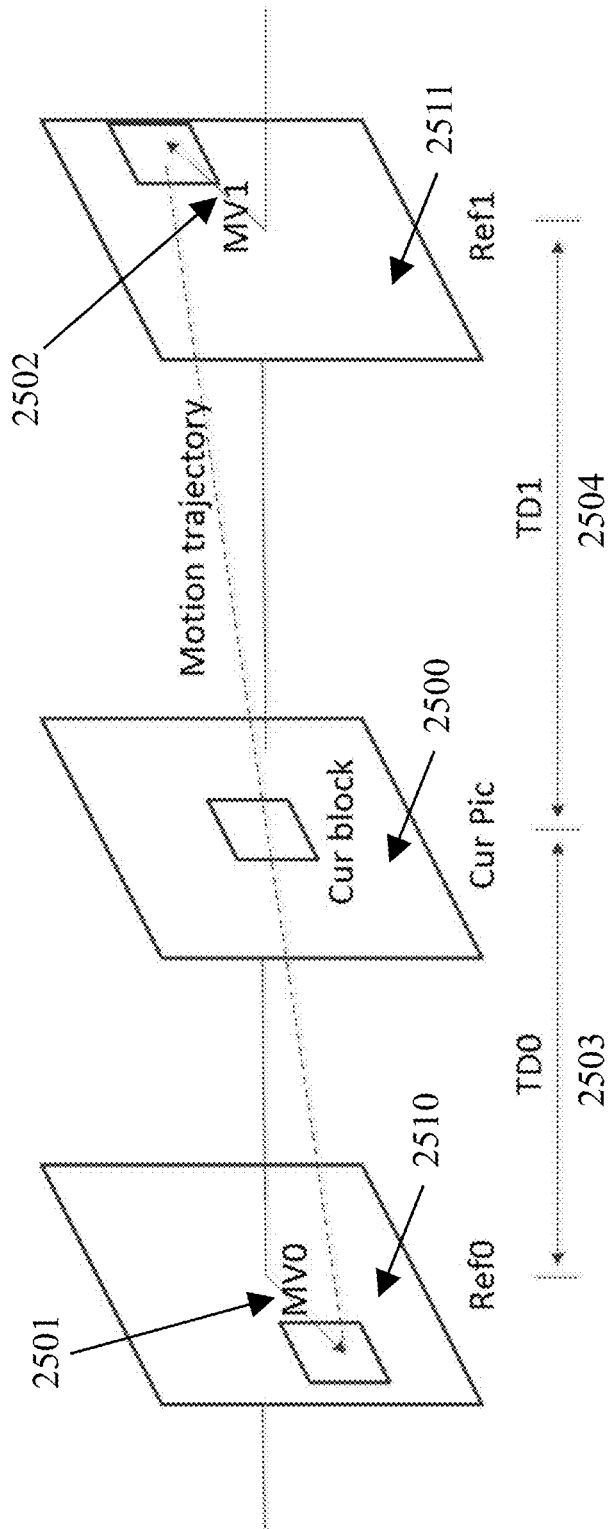
FIG. 25 shows an example of bilateral matching in pattern matched motion vector derivation (PMMVD) mode, which is a special merge mode based on the frame-rate up conversion (FRUC) algorithm.

FIG. 25 shows an example of bilateral matching used in the Frame-Rate Up Conversion (FRUC) method. The bilateral matching is used to derive motion information of the current CU by finding the closest match between two blocks along the motion trajectory of the current CU (2000) in two different reference pictures (2510, 2511). Under the assumption of continuous motion trajectory, the motion vectors MV0 (2501) and MV1 (2502) pointing to the two reference blocks are proportional to the temporal distances, e.g., TD0 (2503) and TD1 (2504), between the current picture and the two reference pictures. In some embodiments, when the current picture 2500 is temporally between the two reference pictures (2510, 2511) and the temporal distance from the current picture to the two reference pictures is the same, the bilateral matching becomes mirror based bi-directional MV.

Figure 26:
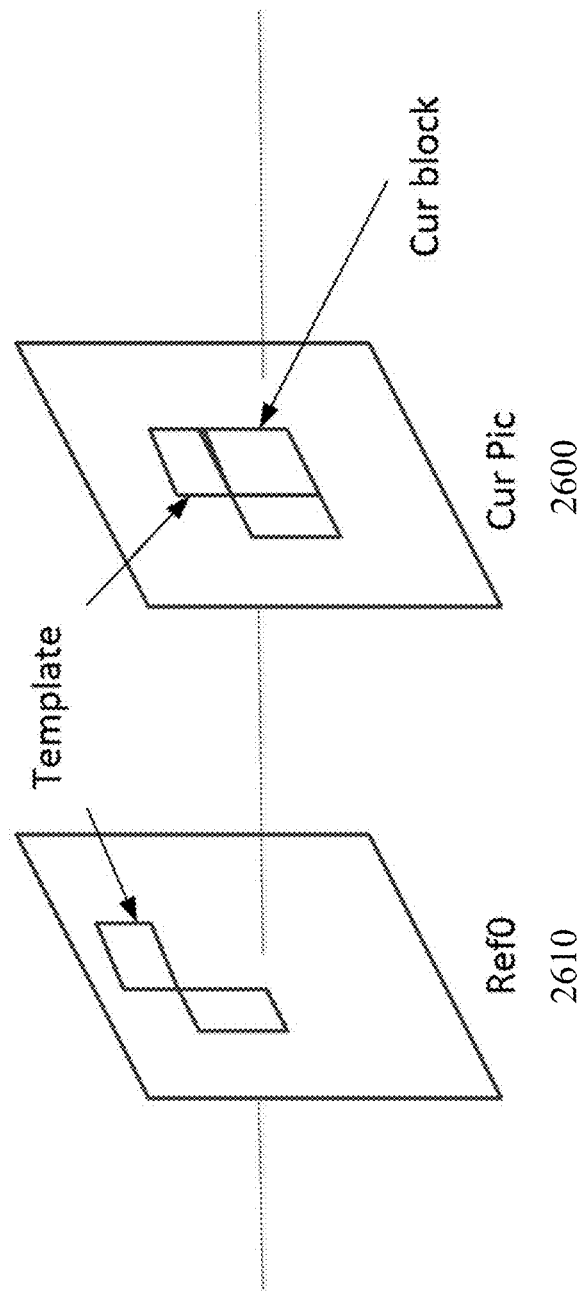
FIG. 26 shows an example of template matching in the FRUC algorithm.

FIG. 26 shows an example of template matching used in the Frame-Rate Up Conversion (FRUC) method. Template matching can be used to derive motion information of the current CU 2600 by finding the closest match between a template (e.g., top and/or left neighboring blocks of the current CU) in the current picture and a block (e.g., same size to the template) in a reference picture 2610. Except the aforementioned FRUC merge mode, the template matching can also be applied to AMVP mode. In both JEM and HEVC, AMVP has two candidates. With the template matching method, a new candidate can be derived. If the newly derived candidate by template matching is different to the first existing AMVP candidate, it is inserted at the very beginning of the AMVP candidate list and then the list size is set to two (e.g., by removing the second existing AMVP candidate). When applied to AMVP mode, only CU level search is applied.

The MV candidate set at CU level can include the following: (1) original AMVP candidates if the current CU is in AMVP mode, (2) all merge candidates, (3) several MVs in the interpolated MV field (described later), and (4) top and left neighboring motion vectors.

When using bilateral matching, each valid MV of a merge candidate can be used as an input to generate a MV pair with the assumption of bilateral matching. For example, one valid MV of a merge candidate is (MVa, $ref_a$) at reference list A. Then the reference picture $ref_b$ of its paired bilateral MV is found in the other reference list B so that $ref_a$ and $ref_b$ are temporally at different sides of the current picture. If such a $ref_b$ is not available in reference list B, $ref_b$ is determined as a reference which is different from $ref_a$ and its temporal distance to the current picture is the minimal one in list B. After $ref_b$ is determined, MVb is derived by scaling MVa based on the temporal distance between the current picture and $ref_a$, $ref_b$.

In some implementations, four MVs from the interpolated MV field can also be added to the CU level candidate list. More specifically, the interpolated MVs at the position (0, 0), (W/2, 0), (0, H/2) and (W/2, H/2) of the current CU are added. When FRUC is applied in AMVP mode, the original AMVP candidates are also added to CU level MV candidate set. In some implementations, at the CU level, 15 MVs for AMVP CUs and 13 MVs for merge CUs can be added to the candidate list.

The MV candidate set at sub-CU level includes:
(1) an MV determined from a CU-level search,
(2) top, left, top-left and top-right neighboring MVs,
(3) scaled versions of collocated MVs from reference pictures,
(4) one or more ATMVP candidates (e.g., up to four), and
(5) one or more STMVP candidates (e.g., up to four).

The scaled MVs from reference pictures are derived as follows. The reference pictures in both lists are traversed. The MVs at a collocated position of the sub-CU in a reference picture are scaled to the reference of the starting CU-level MV. ATMVP and STMVP candidates can be the four first ones. At the sub-CU level, one or more MVs (e.g., up to 17) are added to the candidate list.

Generation of an interpolated MV field. Before coding a frame, interpolated motion field is generated for the whole picture based on unilateral ME. Then the motion field may be used later as CU level or sub-CU level MV candidates.

Figure 27:
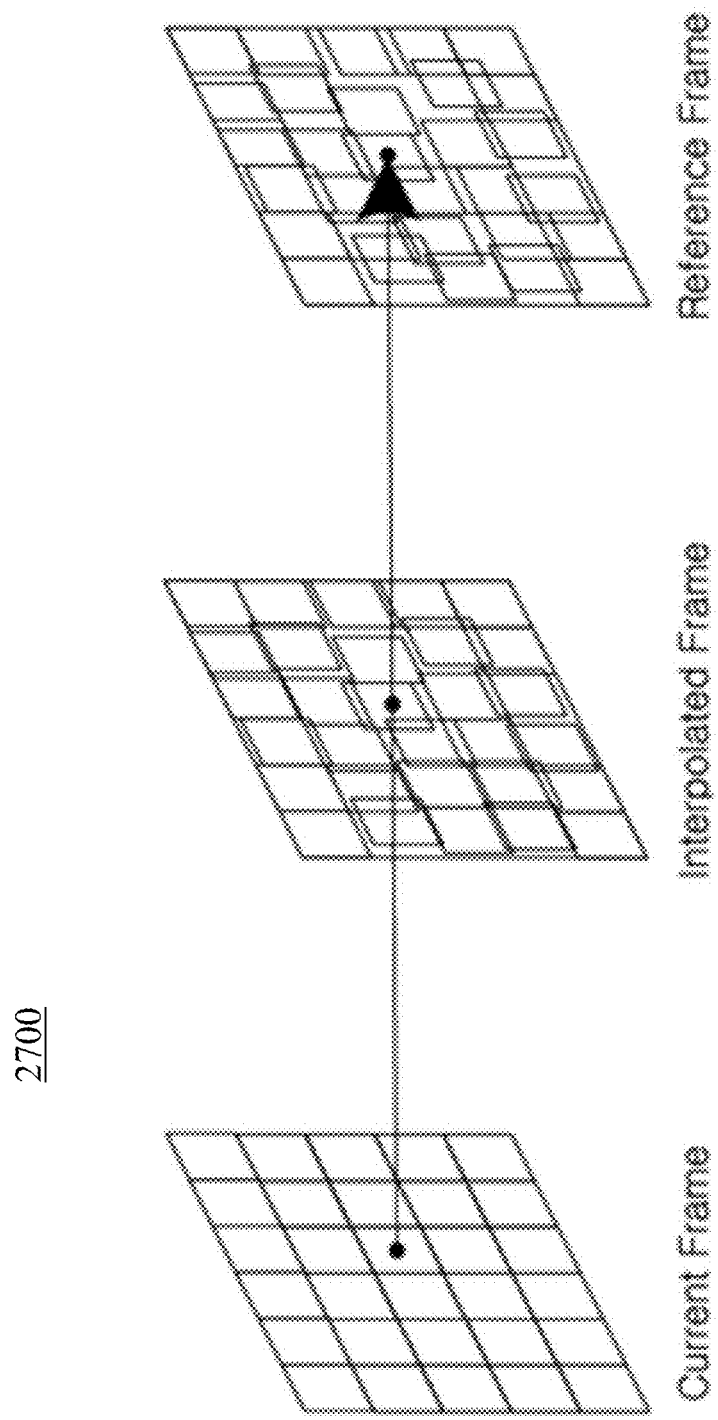
FIG. 27 shows an example of unilateral motion estimation in the FRUC algorithm.

In some embodiments, the motion field of each reference pictures in both reference lists is traversed at 4×4 block level. FIG. 27 shows an example of unilateral Motion Estimation (ME) 2700 in the FRUC method. For each 4×4 block, if the motion associated to the block passing through a 4×4 block in the current picture and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

Interpolation and matching cost. When a motion vector points to a fractional sample position, motion compensated interpolation is needed. To reduce complexity, bi-linear interpolation instead of regular 8-tap HEVC interpolation can be used for both bilateral matching and template matching.

The calculation of matching cost is a bit different at different steps. When selecting the candidate from the candidate set at the CU level, the matching cost can be the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \quad \text{Eq. (23)}$$

Here, w is a weighting factor. In some embodiments, w can be empirically set to 4. MV and $MV^s$ indicate the current MV and the starting MV, respectively. SAD may still be used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

In the bilateral matching merge mode, bi-prediction is applied because the motion information of a CU is derived based on the closest match between two blocks along the motion trajectory of the current CU in two different reference pictures. In the template matching merge mode, the encoder can choose among uni-prediction from list0, uni-prediction from list1, or bi-prediction for a CU. The selection ca be based on a template matching cost as follows:

If costBi<=factor * min (cost0, cost1)
bi-prediction is used;
Otherwise, if cost0<=cost1
uni-prediction from list0 is used;
Otherwise,
uni-prediction from list1 is used;

Here, cost0 is the SAD of list0 template matching, cost1 is the SAD of list1 template matching and costBi is the SAD of bi-prediction template matching. For example, when the value of factor is equal to 1.25, it means that the selection process is biased toward bi-prediction. The inter prediction direction selection can be applied to the CU-level template matching process.

2.9 Examples of Bi-Directional Optical Flow (BIO)

The bi-directional optical flow (BIO) method is a sample-wise motion refinement performed on top of block-wise motion compensation for bi-prediction. In some implementations, the sample-level motion refinement does not use signaling.

Let $I^{(k)}$ be the luma value from reference k (k=0, 1) after block motion compensation, and denote $\partial I^{(k)}/\partial x$ and $\partial I^{(k)}/\partial y$ as the horizontal and vertical components of the $I^{(k)}$ gradient, respectively. Assuming the optical flow is valid, the motion vector field $(v_x, v_y)$ is given by:

$$\partial I^{(k)}/\partial t + v_x \partial I^{(k)}/\partial x + v_y \partial I^{(k)}/\partial y = 0. \quad \text{Eq. (24)}$$

Combining this optical flow equation with Hermite interpolation for the motion trajectory of each sample results in a unique third-order polynomial that matches both the function values $I^{(k)}$ and derivatives $\partial i^{(k)}/\partial x$ and $\partial I^{(k)}/\partial y$ at the ends. The value of this polynomial at t=0 is the BIO prediction:)

$$\text{pred}_{BIO}=1/2 \cdot (I^{(0)}+I^{(1)}+v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad \text{Eq. (25)}$$

Figure 28:
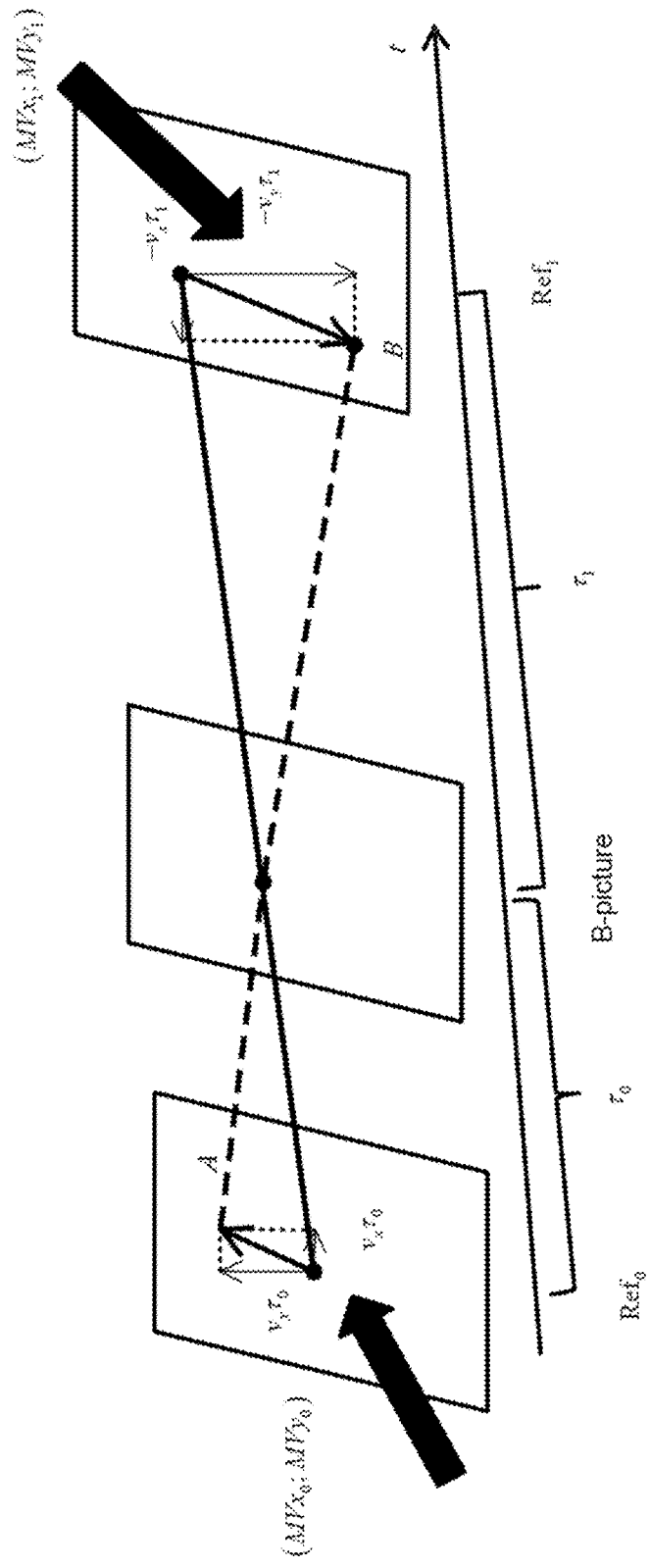
FIG. 28 shows an example of an optical flow trajectory used by the bi-directional optical flow (BIO) algorithm.

FIG. 28 shows an example optical flow trajectory in the Bi-directional Optical flow (BIO) method. Here, $\tau_0$ and $\tau_1$ denote the distances to the reference frames. Distances $\tau_0$ and $\tau_1$ are calculated based on POC for $\text{Ref}_0$ and $\text{Ref}_1$: $\tau_0$=POC(current)−POC($\text{Ref}_0$), $\tau_1$=POC($\text{Ref}_1$)−POC(current). If both predictions come from the same time direction (either both from the past or both from the future) then the signs are different (e.g., $\tau_0 \cdot \tau_1 < 0$). In this case, BIO is applied if the prediction is not from the same time moment (e.g., $\tau_0 \neq \tau_1$). Both referenced regions have non-zero motion (e.g., $\text{MVx}_0, \text{MVy}_0, \text{MVx}_1, \text{MVy}_1 \neq 0$), and the block motion vectors are proportional to the time distance (e.g., $\text{MVx}_0/\text{MVx}_1 = \text{MVy}_0/\text{MVy}_1 = -\tau_0/\tau_1$).

The motion vector field $(v_x, v_y)$ is determined by minimizing the difference Δ between values in points A and B.

FIG. 9 show an example of intersection of motion trajectory and reference frame planes. Model uses only first linear term of a local Taylor expansion for Δ:

$$\Delta=(I^{(0)}-I^{(1)}{}_0+v_x(\tau_1 \partial I^{(1)}/\partial x+\tau_0 \partial I^{(0)}/\partial x)+v_y(\tau_1 \partial I^{(1)}/\partial y+\tau_0 \partial I^{(0)}/\partial y)) \quad \text{Eq. (26)}$$

All values in the above equation depend on the sample location, denoted as (i', j'). Assuming the motion is consistent in the local surrounding area, Δ can be minimized inside the (2M+1)×(2M+1) square window SI centered on the currently predicted point (i,j), where M is equal to 2:

$$(v_x, v_y) = \underset{v_x, v_y}{\arg\min} \sum_{[i',j] \in \Omega} \Delta^2[i', j'] \quad \text{Eq. (27)}$$

For this optimization problem, the JEM uses a simplified approach making first a minimization in the vertical direction and then in the horizontal direction. This results in the following:

$$v_x = (s_1 + r) > m ? \text{clip3}\left(-thBIO, thBIO, -\frac{s_3}{(s_1 + r)}\right) : 0 \quad \text{Eq. (28)}$$

$$v_y = (s_5 + r) > m ? \text{clip3}\left(-thBIO, thBIO, -\frac{s_6 - v_x s_2 / 2}{(s_5 + r)}\right) : 0 \quad \text{Eq. (29)}$$

where, $$s_1 = \sum_{[i',j] \in \Omega} (\tau_1 \partial I^{(1)}/\partial x + \tau_0 \partial I^{(0)}/\partial x)^2; \quad \text{Eq. (30)}$$

$$s_3 = \sum_{[i',j] \in \Omega} (I^{(1)} - I^{(0)})(\tau_1 \partial I^{(1)}/\partial x + \tau_0 \partial I^{(0)}/\partial x);$$

$$s_2 = \sum_{[i',j] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j] \in \Omega} (\tau_1 \partial I^{(1)}/\partial y + \tau_0 \partial I^{(0)}/\partial y)^2;$$

$$s_6 = \sum_{[i',j] \in \Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m can be introduced in Eq. (28) and Eq. (29), where:

$$r=500 \cdot 4^{d-8} \quad \text{Eq. (31)}$$

$$m=700 \cdot 4^{d-8} \quad \text{Eq. (32)}$$

Here, d is bit depth of the video samples.

Figures 29A, 29B:
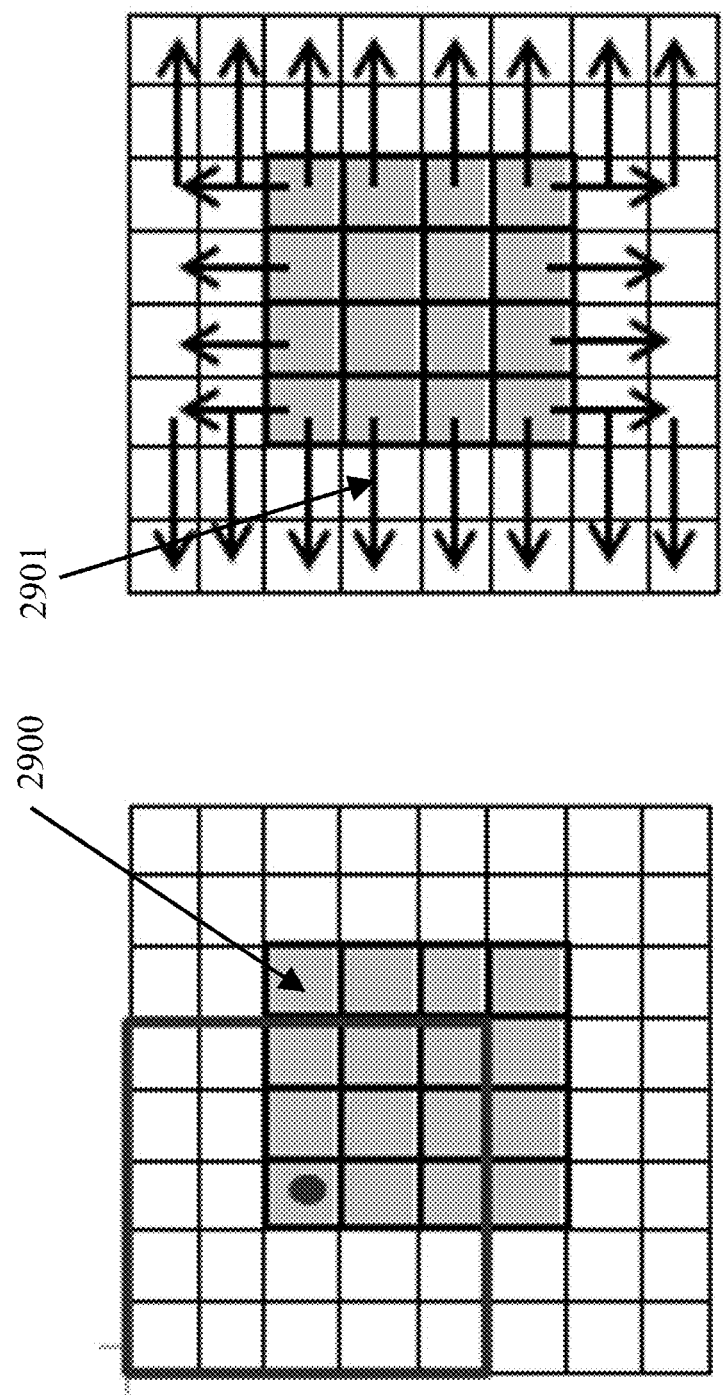
FIGS. 29A and 29B show example snapshots of using of the bi-directional optical flow (BIO) algorithm without block extensions.

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated for positions inside the current block. FIG. 29A shows an example of access positions outside of a block 2900. As shown in FIG. 29A, in Eq. (30), (2M+1)×(2M+1) square window Ω centered in currently predicted point on a boundary of predicted block needs to accesses positions outside of the block. In the JEM, values of $I^{(k)}$, $\partial I^{(k)}/\partial x$, $\partial I^{(k)}/\partial y$ outside of the block are set to be equal to the nearest available value inside the block. For example, this can be implemented as a padding area 2901, as shown in FIG. 29B.

With BIO, it is possible that the motion field can be refined for each sample. To reduce the computational complexity, a block-based design of BIO is used in the JEM. The motion refinement can be calculated based on a 4×4 block.

In the block-based BIO, the values of $s_n$ in Eq. (30) of all samples in a 4×4 block can be aggregated, and then the aggregated values of $s_n$ in are used to derived BIO motion vectors offset for the 4×4 block. More specifically, the following formula can used for block-based BIO derivation:

$$s_{1,b_k} = \sum_{(x,y) \in b_k} \sum_{[i',j] \in \Omega(x,y)} (\tau_1 \partial I^{(1)}/\partial x + \tau_0 \partial I^{(0)}/\partial x)^2; \quad \text{Eq. (33)}$$

$$s_{3,b_k} = \sum_{(x,y) \in b_k} \sum_{[i',j] \in \Omega} (I^{(1)} - I^{(0)})(\tau_1 \partial I^{(1)}/\partial x + \tau_0 \partial I^{(0)}/\partial x);$$

$$s_{2,b_k} = \sum_{(x,y) \in b_k} \sum_{[i',j] \in \Omega} (\tau_1 \partial I^{(1)}/\partial x + \tau_0 \partial I^{(0)}/\partial x)$$

$$(\tau_1 \partial I^{(1)}/\partial y + \tau_0 \partial I^{(0)}/\partial y);$$

$$s_{5,b_k} = \sum_{(x,y) \in b_k} \sum_{[i',j] \in \Omega} (\tau_1 \partial I^{(1)}/\partial y + \tau_0 \partial I^{(0)}/\partial y)^2;$$

$$s_{6,b_k} = \sum_{(x,y) \in b_k} \sum_{[i',j] \in \Omega} (I^{(1)} - I^{(0)})(\tau_1 \partial I^{(1)}/\partial y + \tau_0 \partial I^{(0)}/\partial y)$$

Here, $b_k$ denotes the set of samples belonging to the k-th 4×4 block of the predicted block. $s_n$ in Eq (28) and Eq (29) are replaced by $((s_n, b_k) >> 4)$ to derive the associated motion vector offsets.

In some scenarios, MV regiment of BIO may be unreliable due to noise or irregular motion. Therefore, in BIO, the magnitude of MV regiment is clipped to a threshold value. The threshold value is determined based on whether the reference pictures of the current picture are all from one direction. For example, if all the reference pictures of the current picture are from one direction, the value of the threshold is set to $12 \times 2^{14-d}$; otherwise, it is set to $12 \times 2^{13-d}$.

Gradients for BIO can be calculated at the same time with motion compensation interpolation using operations consistent with HEVC motion compensation process (e.g., 2D separable Finite Impulse Response (FIR)). In some embodiments, the input for the 2D separable FIR is the same reference frame sample as for motion compensation process and fractional position (fracX, fracY) according to the fractional part of block motion vector. For horizontal gradient $\partial I/\partial x$, a signal is first interpolated vertically using BIOfilterS corresponding to the fractional position fracY with de-scaling shift d-8. Gradient filter BIOfilterG is then applied in horizontal direction corresponding to the fractional position fracX with de-scaling shift by 18-d. For vertical gradient $\partial I/\partial y$, a gradient filter is applied vertically using BIOfilterG corresponding to the fractional position fracY with de-scaling shift d-8. The signal displacement is then performed using BIOfilterS in horizontal direction corresponding to the fractional position fracX with de-scaling shift by 18-d. The length of interpolation filter for gradients calculation BIOfilterG and signal displacement BIOfilterF can be shorter (e.g., 6-tap) in order to maintain reasonable complexity. Table 1 shows example filters that can be used for gradients calculation of different fractional positions of block motion vector in BIO. Table 2 shows example interpolation filters that can be used for prediction signal generation in BIO.

TABLE 1

Exemplary filters for gradient calculations in BIO

| Fractional pel position | Interpolation filter for gradient(BIOfilterG) |
| --- | --- |
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

Exemplary interpolation filters for prediction signal generation in BIO

| Fractional pel position | Interpolation filter for prediction signal(BIOfilterS) |
| --- | --- |
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO can be applied to all bi-predicted blocks when the two predictions are from different reference pictures. When Local Illumination Compensation (LIC) is enabled for a CU, BIO can be disabled.

In some embodiments, OBMC is applied for a block after normal MC process. To reduce the computational complexity, BIO may not be applied during the OBMC process. This means that BIO is applied in the MC process for a block when using its own MV and is not applied in the MC process when the MV of a neighboring block is used during the OBMC process.

2.10 Examples of Decoder-Side Motion Vector Refinement (DMVR)

In a bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 30:
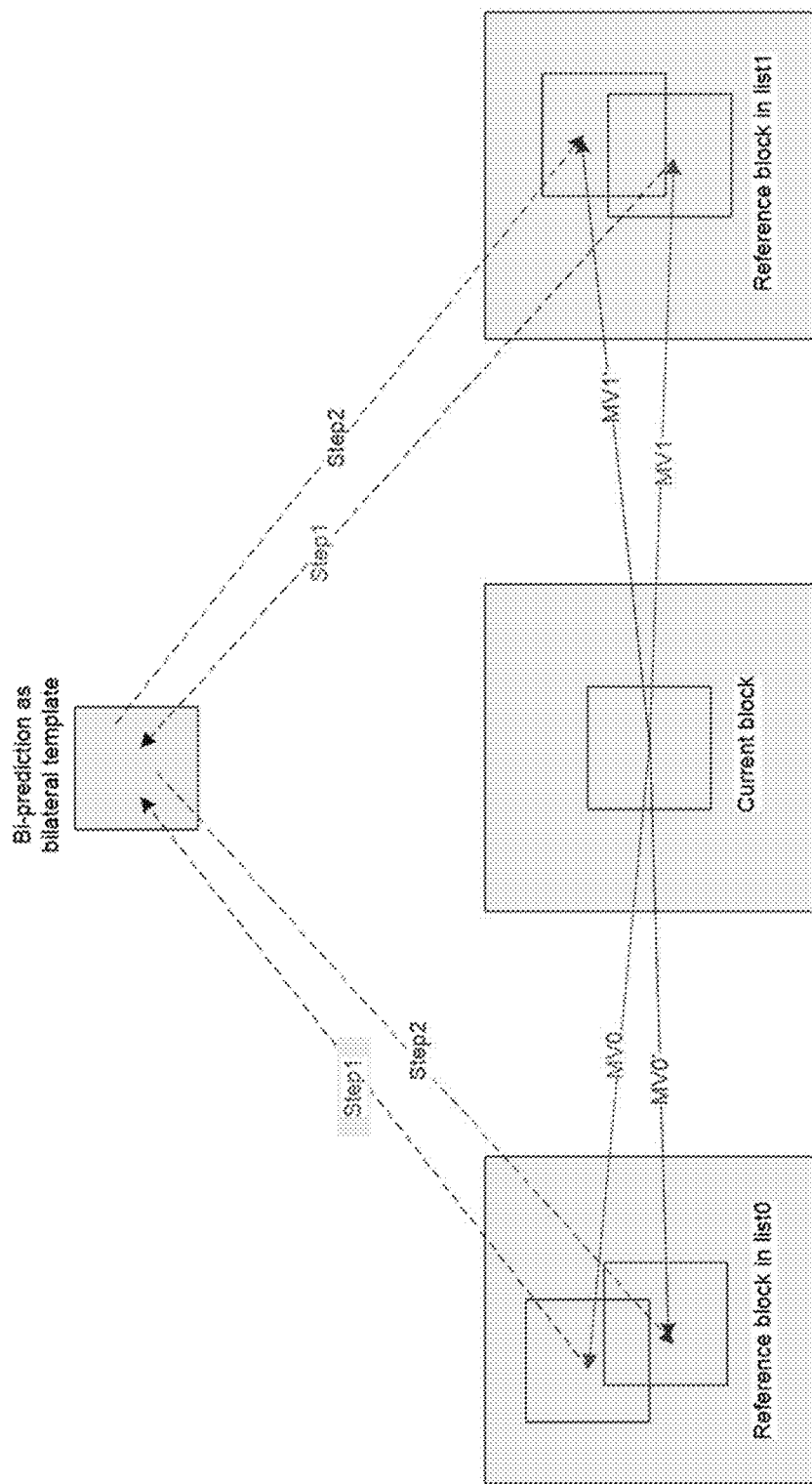
FIG. 30 shows an example of the decoder-side motion vector refinement (DMVR) algorithm based on bilateral template matching.

In DMVR, a bilateral template is generated as the weighted combination (i.e. average) of the two prediction blocks, from the initial MV0 of list0 and MV1 of list1, respectively, as shown in FIG. 30. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 30, are used for generating the final bi-prediction results. A sum of absolute differences (SAD) is used as the cost measure.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

2.11 Example of a Sub-Block Based Merge Candidate List

In some embodiments (e.g., JVET-L0369), a sub-block based merge candidate list is generated by moving ATMVP from regular merge list to the first location of the affine merge list. The max number of the sub-block based merge list is kept as 5, and for regular merge list, the list length is reduced from 6 to 5.

The sub-block merge candidate list is constructed as following steps:
1) Insert ATMVP candidate
2) Insert inherited affine candidates
3) Insert constructed affine candidates
4) Padding with zero motion vectors Merge index of sub-block based merge list is binarized with truncated unary code.

3. Drawbacks of Existing Implementations

In an existing implementation for affine inter mode, corner points are always selected as control points for 4/6-parameter affine model. However, since the affine parameters are represented by CPMVs, when deriving the motion vectors using Equation (1), this may lead to larger error as for larger x and y.

In other existing implementations for sub-block based merge candidate lists, when encoding the merge index, all bins are coded with context, which increases the burden of parsing process. Furthermore, how to harmonize affine with UMVE/triangular partitions is unknown. One aspect of utilizing temporal affine information is missing in current affine design.

4. Example Methods for Control Point Selection for Affine Mode Coding

Embodiments of the presently disclosed technology overcome the drawbacks of existing implementations, thereby providing video coding with higher coding efficiencies. The selection of control points for affine mode coding, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined. For the examples described below, denote a block size as W×H and the sub-block size in affine mode as sW×sH.

EXAMPLE 1

It is proposed that different sets of control points may be used for 4-parameter affine model instead of always using positions at (0, 0) and (W, 0).

Figure 31:
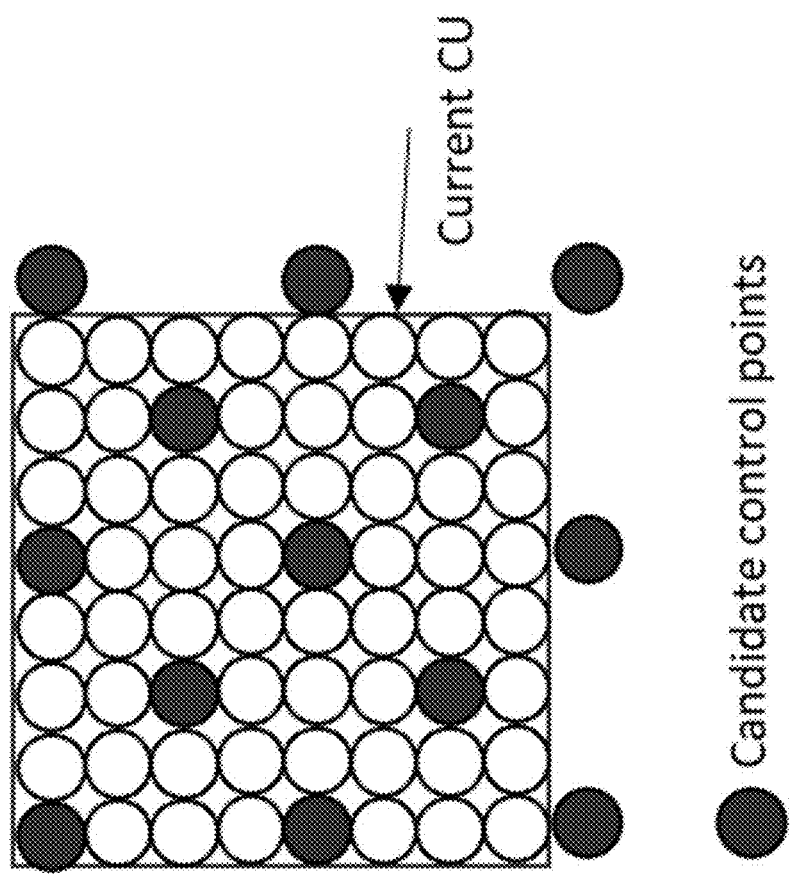
FIG. 31 shows an example of different control point of a coding unit.

(a) For example, any 2 of the highlighted (shaded) points in FIG. 31 can constitute a control point pair.

(b) In one example, position (0, 0) and (W/2, 0) are selected as the control points.

(c) In one example, position (0, 0) and (0, H/2) are selected as the control points.

(d) In one example, position (W, 0) and (0, H) are selected as the control points.

(e) In one example, position (W/2, H/2) and (W, 0) are selected as the control points.

(f) In one example, position (W/2, H/2) and (0, 0) are selected as the control points.

(g) In one example, position (0, H/2) and (W, H/2) are selected as the control points.

(h) In one example, position (W/4, H/2) and (3*W/4, H/2) are selected as the control points.

(i) In one example, position (W/2, H/4) and (W/2, 3*H/4) are selected as the control points.

(j) In one example, position (W, 0) and (W, H) are selected as the control points.

(k) In one example, position (W/2, 0) and (W/2, H) are selected as the control points.

(l) In one example, position (W/4, H/4) and (3*W/4, 3*H/4) are selected as the control points.

(m) In one example, position (3* W/4, H/4) and (W/4, 3* H/4) are selected as the control points.

(n) In one example, position (sW/2, 0) and (W/2+sW/2, 0) are selected as the control points.

(o) In one example, position (0, sH/2) and (0, H/2+sH/2) are selected as the control points.

(p) In one example, position (0, H/2) and (W/2, 0) are selected as the control points.

(q) In one example, position (0, H) and (W, 0) are selected as the control points.

(r) In one example, position (0, 0) and (W, H) are selected as the control points.

EXAMPLE 2

It is proposed that instead of using (0, 0), (W, 0) and (0, H), different sets of control points may be used for 6-parameter affine model.

(a) For example, any 3 of the highlighted red points in FIG. 31 that are not in a straight line can compose a control point set.

(b) In one example, position (W/2, 0), (0, H) and (W, H) are selected as the control points.

(c) In one example, position (0, 0), (W, 0) and (W/2, H) are selected as the control points.

(d) In one example, position (0, 0), (W, H/2) and (0, H) are selected as the control points.

(e) In one example, position (0, H/2), (W, 0) and (W, H) are selected as the control points.

(f) In one example, position (W/4, H/4), (3* W/4, H/4) and (3* W/4, 3* H/4) are selected as the control points.

(g) In one example, position (3* W/4, H/4), (W/4, 3* H/4) and (3* W/4, 3* H/4) are selected as the control points.

(h) In one example, position (0, 0), (W, 0) and (0, H/2) are selected as the control points.

(i) In one example, position (0, 0), (W, 0) and (W, H/2) are selected as the control points.

(j) In one example, position (3* W/4-sW/2, H/4), (W/4-sW/2, 3* H/4) and (3* w/4-sW/2, 3* H/4) are selected as the control points.

(k) In one example, position (3* W/4-sW/2, H/4-sH/2), (W/4-sW/2, 3* H/4-sH/2) and (3* w/4-sW/2, 3* H/4-sH/2) are selected as the control points.

EXAMPLE 3

Selection of the control points may depend on the motion information, slice/tile/picture type, block size and block shape.

(a) In one example, for blocks with width≥height, (W/2, 0) and (W/2, H) are selected as the control points for 4-parameters model.

(b) In one example, for blocks with width≥height, (W/4, H/2) and (W*3/2, H/2) are selected as the control points for 4-parameters model.

(c) In one example, for blocks with width≥height, (0, H/2) and (W, H/2) are selected as the control points for 4-parameters model.

(d) In one example, for blocks with width≤height, (W/2, 0) and (W/2, H) are selected as the control points for 4-parameters model.

(e) In one example, for blocks with width≤height, (W/2, H/4) and (W/2, H*3/4) are selected as the control points for 4-parameters model.

(f) In one example, for blocks with width≤height, (0, H/2) and (W, H/2) are selected as the control points for 4-parameters model.

(g) In one example, for blocks with width≥height, (0, 0), (W/2, H) and (W, H) are selected as the control points for 4-parameters model.

(h) In one example, for blocks with width≥height, (0, 0), (0, H) and (W, H/2) are selected as the control points for 4-parameters model.

(i) Motion information of a large set of control points may be firstly checked, e.g., in terms of similarity, and those which are associated with more closely motion information to each other may be selected as the control points.

EXAMPLE 4

The motion vectors at the proposed control points may be stored separately from the normal motion vector buffer. Alternatively, the motion vectors at the proposed control points may be stored in the normal motion vector buffer.

EXAMPLE 5

Figure 32:
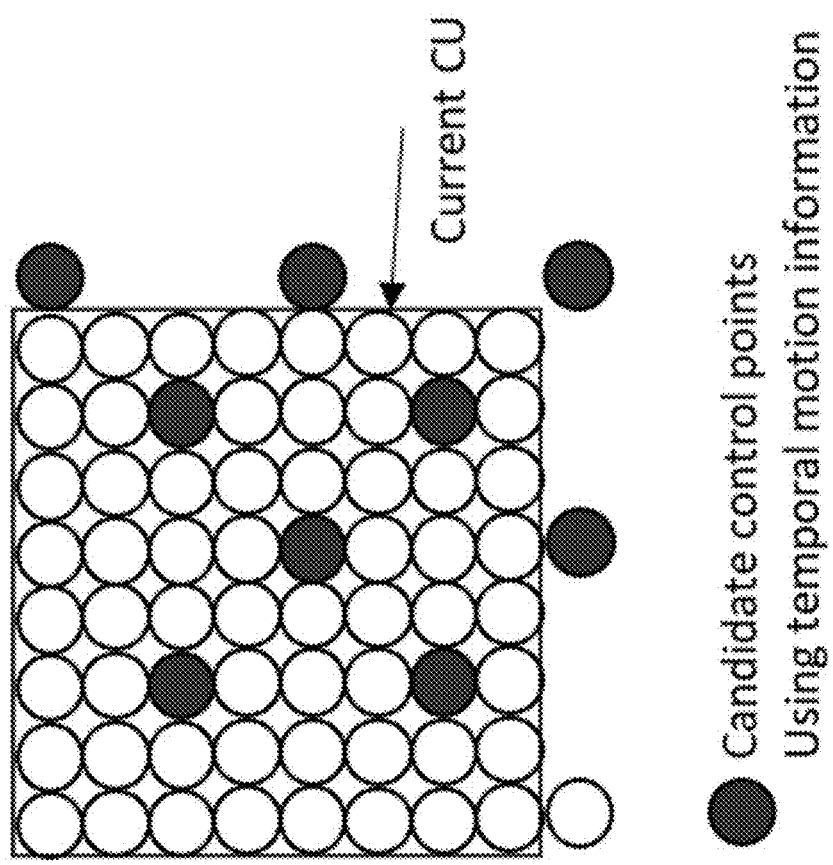
FIG. 32 shows an example of control points using temporal motion information.

In affine merge mode or affine inter mode, temporal motion information may be used for deriving the constructed affine merge/AMVP candidates if some selected control points are not at the top row or left column, as shown in FIG. 32.

(a) In one example, for such a control point, its associate motion information may be derived from one or multiple temporal block which is not located within the same tile/slice/picture.

(i) In one example, the co-located reference picture and the co-located block of a selected control point is firstly identified, then the motion vector of the co-located block is scaled (if necessary) to generate the motion vector predictor. Such process is performed in the same way as TMVP.

(ii) Alternatively, the co-located reference picture is signaled in the SPS/PPS/slice header/tile group header.

(iii) Alternatively, the co-located reference picture is determined by checking neighboring motion information of the block. For example, reference picture of the first available neighboring motion information in list X or 1-X is selected as the co-located picture for prediction direction X, wherein X is 0 or 1.

(iv) Alternatively, the most frequently referenced picture by neighboring blocks of the CU in list X or 1-X is selected as the co-located picture for prediction direction X.

(v) Alternatively, the co-located block is identified by a spatially neighboring motion information. For example, neighboring blocks of the CU are scanned in order, and the first available motion information referring to the co-located picture is used to identify the co-located block.

(vi) Alternatively, if no neighboring motion information refers to the co-located picture, neighboring blocks of the CU are scanned in order, and the first available motion information is scaled to the co-located picture to identify the co-located block.

(vii) Motion than one co-located blocks may be identified and checked.

(b) Alternatively, for such a control point, motion information of its several nearest spatial neighboring blocks may be checked in order and the first available motion information referring to the target reference picture is used as the motion vector predictor.

(i) If no neighboring motion information is available, such control point is considered as unavailable.

(ii) If no neighboring motion information refers to the target reference picture, such control point is considered as unavailable.

(iii) Alternatively, if no neighboring motion information refers to the target reference picture, the first available neighboring motion information is scaled to the target reference picture and is used as the motion vector predictor.

(iv) In one example, when generating the motion vector predictor in list X for such control point, for each available bi-directional neighboring motion information, motion vector in list X is first checked and motion vector in list 1-X is then checked.

(v) In one example, if a control point is nearer to a corner point (denoted by $N_{cp}$) than other corner points, the procedure described in Section 2.7.3 is performed to derive the motion vector predictor of $N_{cp}$ and is then used for the control point.

EXAMPLE 6

In affine inter mode, MVD of one control point may be predicted from another control point. In one example, position (W/4, H/4) and (3* W/4, 3* H/4) are selected as the control points, and MVD of control point (3* W/4, 3* H/4) is predicted from MVD of control point (W/4, H/4).

EXAMPLE 7

It is proposed that CPMVs of neighboring blocks may be used to derive motion vectors for one or multiple positions within the current block and/or adjacent to the current block (e.g., representative points outside the neighboring block but within and/or adjacent to the current block), and the derived MVs may be used to generate the final prediction block of the current block, (e.g., the derived MVs may be used in the OBMC process).

Figure 33:
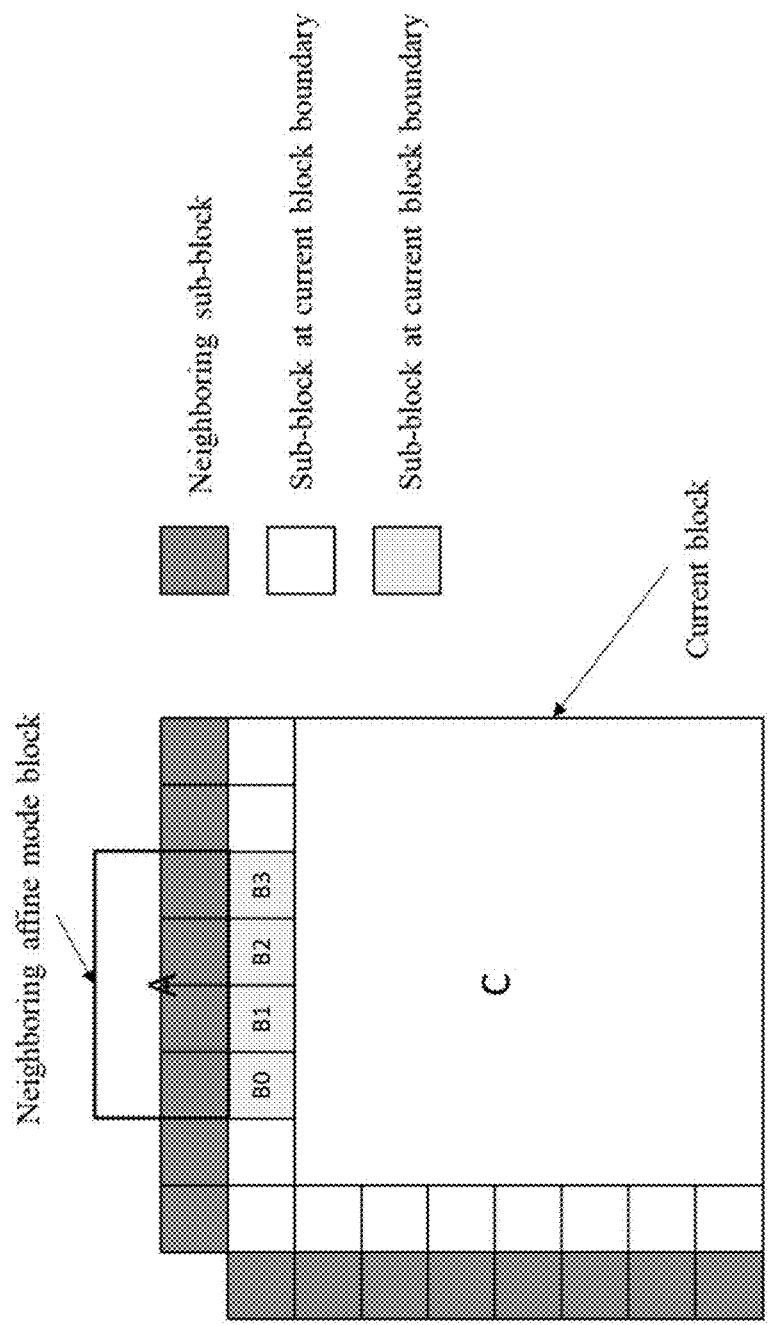
FIG. 33 shows an example of using control point motion vectors (CPMVs) of a neighboring CU to derive motion vectors used in OBMC.

(a) As shown in FIG. 33, if a neighboring block (e.g., block A) is coded with affine mode, its associated CPMVs are used to derive MVs for block A neighboring sub-blocks (e.g., sub-blocks B0~B3) located in current block, e.g., sub-blocks heighted in yellow.

(b) CPMVs of neighboring blocks may be used to derive motion information for the top-left corner positions of the current block. For example, if using equaton (1a) and/or (1b), the representative point (x, y) may be set to (W'+sW/2, H'+sH/2) supposing the neighboring affine-coded block size is denoted by W'×H'.

(c) CPMVs of neighboring blocks may be used to derive motion information for the center positions of the current block or of sub-blocks located at the top row and/or left column of the current block. For example, if using equation (1a) and/or (1b), the representative point (x, y) may be set to (W'+W/2+sW/2, H'+H/2+sH/2) or to (W'+W/2-sW/2, H'+H/2-sH/2) supposing the neighboring affine-coded block size is denoted by W' x H'.

(d) CPMVs of neighboring blocks may be used to derive motion information for the bottom-right position of the current block. For example, if using equaton (1a) and/or (1b), the representative point (x, y) may be set to (W'+W-sW/2, H'+H-sH/2) or (W'+W+sW/2, H'+H+sH/2) or (W'+W, H'+H) supposing the neighboring affine-coded block size is denoted by W'×H'.

EXAMPLE 8

Figure 34:
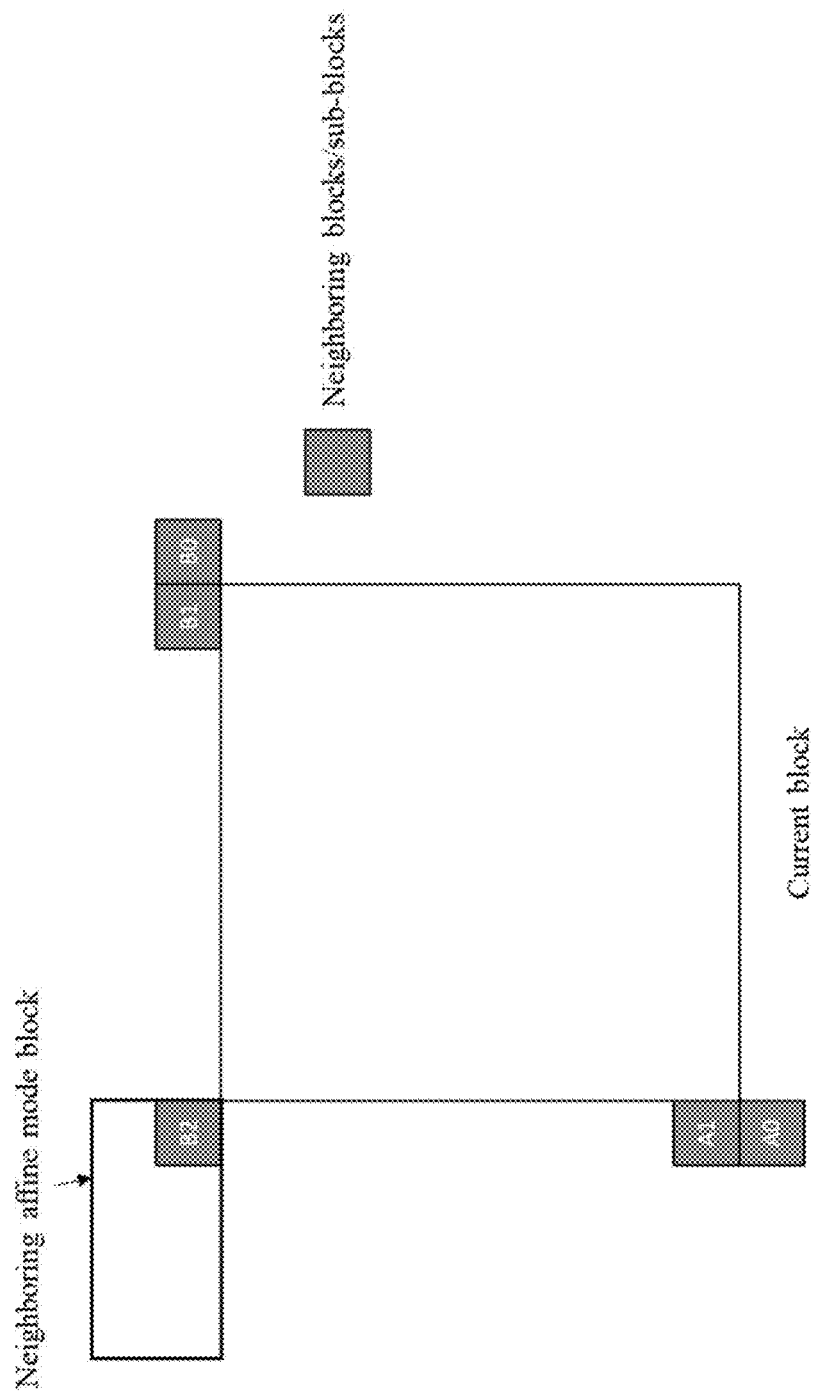
FIG. 34 shows an example of using CPMVs of a neighboring block to derive a motion vector predictor.

It is proposed that in AMVP/merge/UMVE/triangular mode, if a neighboring block is coded in affine mode, CPMVs of the neighboring block may be used to derive the motion vector predictor of the current block by setting the representative point(s) to be a position (or positions) within current block. An example is shown in FIG. 34.

(a) In one example, center position of the current block is used as representative point to derive the MV predictor.

(b) In one example, top-left corner position of the current block is used as representative point to derive the MV predictor.

(c) The derived MV predictors may be inserted into AMVP/merge list or UMVE based merge list or triangular merge list additionally.

(d) In one example, the derived MV predictors may be used to replace MVs of the corresponding neighboring blocks. Therefore, the neighboring block's motion information is not used as a predictor for coding the current block. For example, in FIG. 35, the derived MV predictor is used to replace the motion information associated with block B2.

(e) In one example, if several neighboring blocks are from one same affined-coded CU/PU, the derived MVs is only used to replace MVs of one neighboring block.

(f) Alternatively, if several neighboring blocks are from one same affined-coded CU/PU, the derived MVs is used and MVs of all these neighboring blocks are not inserted into the list.

(g) Alternatively, if several neighboring blocks are from one same affined-coded CU/PU, different positions within current block may be used to derive multiple MV predictors, which are further used to replace MVs of all these neighboring blocks.

(h) In one example, if M neighboring blocks are from N affined-coded CUs/PUs, only K derived (may use different positions of the block) MV predictors are generated and are used to replace MVs of K neighboring blocks, wherein K=1, 2, . . ., or M. Alternatively, K=1, 2, . . . , or N.

(i) In one example, the derived MV predictors are given higher priority than other normal MV predictors. That is, they may be added to the motion vector candidate list earlier than other normal MV predictors.

(j) Alternatively, the derived MV predictors are given lower priority than other normal MV predictors. That is, they may be added to the motion vector candidate list after other normal MV predictors.

(k) In one example, the derived MV predictors are of same priority with other normal MV predictors. That is, they may be added to the motion vector candidate list in an interleaved way with other normal MV predictors.

EXAMPLE 9

It is proposed that when encoding merge index of the sub-block based merge candidate list, some bins are bypass coded. Denote the maximum length of sub-block based merge candidate list as maxSubMrgListLen.

(a) In one example, only the first bin is coded with context and all other bins are bypass coded.
  (i) In one example, one context is used for encoding the first bin.
  (ii) In one example, more than 1 contexts are used for encoding the first bin. For example, 3 contexts are used as follows:
    (1) ctxIdx=aboveBlockIsAffineMode+leftBlockIsAffineMode;
    (2) aboveBlockIsAffineMode equals to 1 if the above neighboring block is coded in affine mode, otherwise it equals to 0; and
    (3) leftBlockIsAffineMode equals to 1 if the left neighboring block is coded in affine mode, otherwise it equals to 0.

(b) In one example, only the first K bins are coded with contexts and all other bins are bypass coded, wherein K=0, 1, . . . , or maxSubMrgListLen −1.
  (i) In one example, one context is shared for all context coded bins except the first bin.
  (ii) In one example, one context is used for each context coded bin except the first bin.

EXAMPLE 10

Whether to enable or disable the adaptive control point selection method may be signaled in SPS/PPS/VPS/sequence header/picture header/slice header/tile group header/group of CTUs, etc.

(a) In one example, adaptive control point selection is not applied if the block is coded with affine merge mode.

(b) In one example, adaptive control point selection is not applied if there is no affine MVD coded for the block.

(c) In one example, adaptive control point selection is not applied if there is no non-zero affine MVD coded for the block.

EXAMPLE 11

Whether to apply or how to apply adaptive control point selection on an affine coded block may depend on the reference picture of the current block. In one example, adaptive control point selection is not applied if the reference picture is the current picture, e.g., Intra block copying is applied in the current block.

EXAMPLE 12

The proposed methods may be applied under certain conditions, such as block sizes, encoding mode, motion information, slice/picture/tile types.

(a) In one example, when a block size contains less than M*H samples, e.g., 16 or 32 or 64 luma samples, the above methods are not allowed.

(b) In one example, when a block size contains more than M*H samples, e.g., 16 or 32 or 64 luma samples, the above methods are not allowed.

(c) Alternatively, when minimum size of a block's width or height is smaller than or no larger than X, the above methods are not allowed. In one example, X is set to 8.

(d) In one example, when a block with either width or height or both width and height are both larger than (or equal to) a threshold L, the block may be split into multiple sub-blocks. Each sub-block is treated in the same way as a normal coding block with size equal to the sub-block size.

(i) In one example, L is 64, a 64×128/128×64 block is split into two 64×64 sub-blocks, and a 128×128 block is split into four 64×64 sub-blocks. However, N×128/128×N block, wherein N<64, is not split into sub-blocks.

(ii) In one example, L is 64, a 64×128/128×64 block is split into two 64×64 sub-blocks, and a 128×128 block is split into four 64×64 sub-blocks. Meanwhile, N×128/128×N block, wherein N<64, is split into two N×64/64×N sub-blocks.

EXAMPLE 13

When CPMVs are stored in a separate buffer different from conventional MVs used for motion compensation, CPMV may be stored in the same precision as those used for motion compensation.

(a) In one example, for both conventional MVs used for motion compensation and CPMVs, they are stored with 1/M-pel precision, e.g., M=16 or 4.

(b) Alternatively, the precision for CPMV storage may be different from that used for motion compensation. In one example, CPMV may be storage with 1/N-pel precision and MVs used for motion compensation may be stored with 1/M-pel precision wherein M is unequal to N. in one example, M is set to 4 and N is set to 16.

EXAMPLE 14

It is proposed that CPMVs used for affine motion field generation may be firstly modified before being used to derive affine motion field.

(a) In one example, CPMVs may be firstly shifted to a higher precision. After deriving the affine motion information for one position/one block, the derived motion information may need to be further scaled to be aligned with the precision of regular MVs used for motion compensation.

(b) Alternatively, CPMVs may be firstly rounded (scaled) to be aligned with the precision of regular MVs used for motion compensation, then the rounded CPMVs are used to derive the affine motion filed. For example, when CPMVs are stored with 1/16-pel precision and regular MVs are stored with 1/4-pel precision, such method could be applied.

(c) The rounding process may be defined as f(x)=(x+offset)>>L, e.g., offset=1<<(L-1), L may be dependent on the precisions of stored CPMVs and regular MVs.

(d) The shifting process may be defined as f(x)=x<<L, e.g., L=2.

The examples described above may be incorporated in the context of the method described below, e.g., methods 3500, 3530 and 3560, which may be implemented at a video decoder or a video encoder.

Figure 35A:
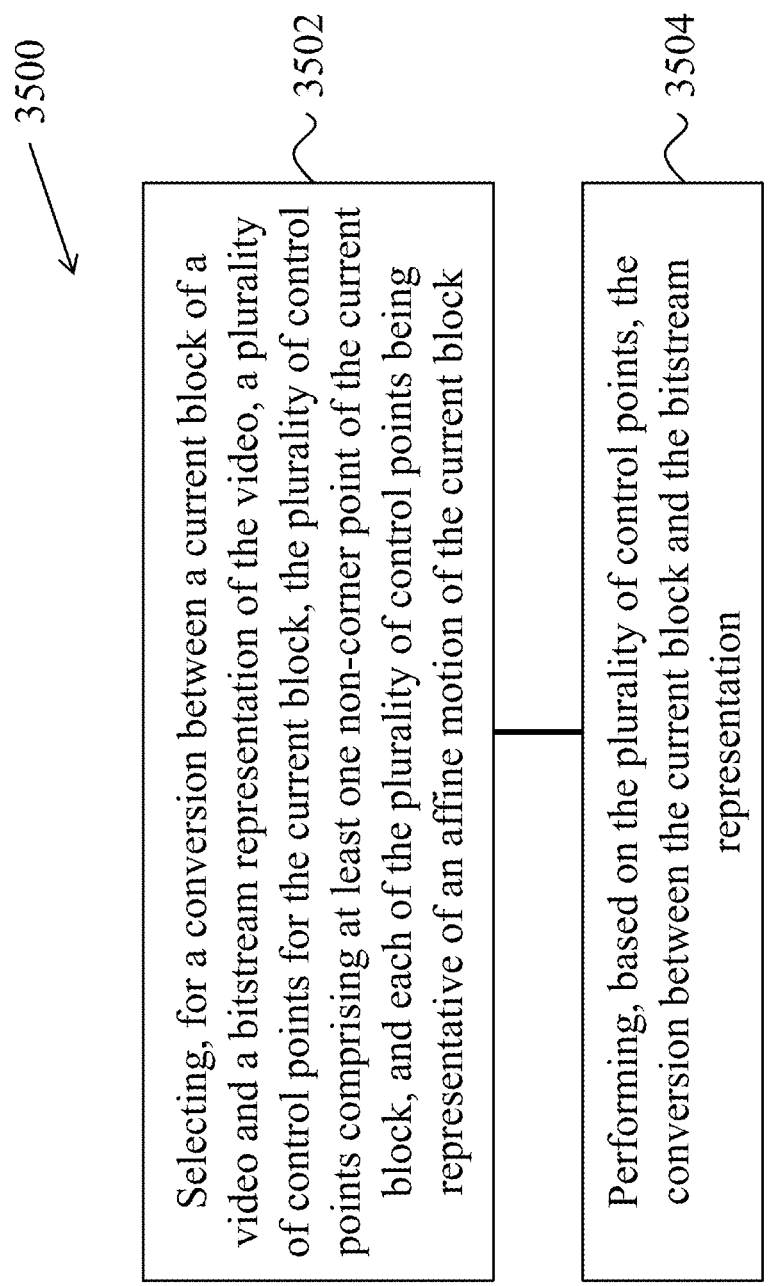
FIGS. 35A-35C show flowcharts of example methods for video coding.

FIG. 35A shows a flowchart of an exemplary method for video processing. The method 3500 includes, at step 3502, selecting, for a conversion between a current block of a video and a bitstream representation of the video, a plurality of control points for the current block, the plurality of control points comprising at least one non-corner point of the current block, and each of the plurality of control points being representative of an affine motion of the current block.

The method 3500 includes, at step 3504, performing, based on the plurality of control points, the conversion between the current block and the bitstream representation.

Figure 35B:
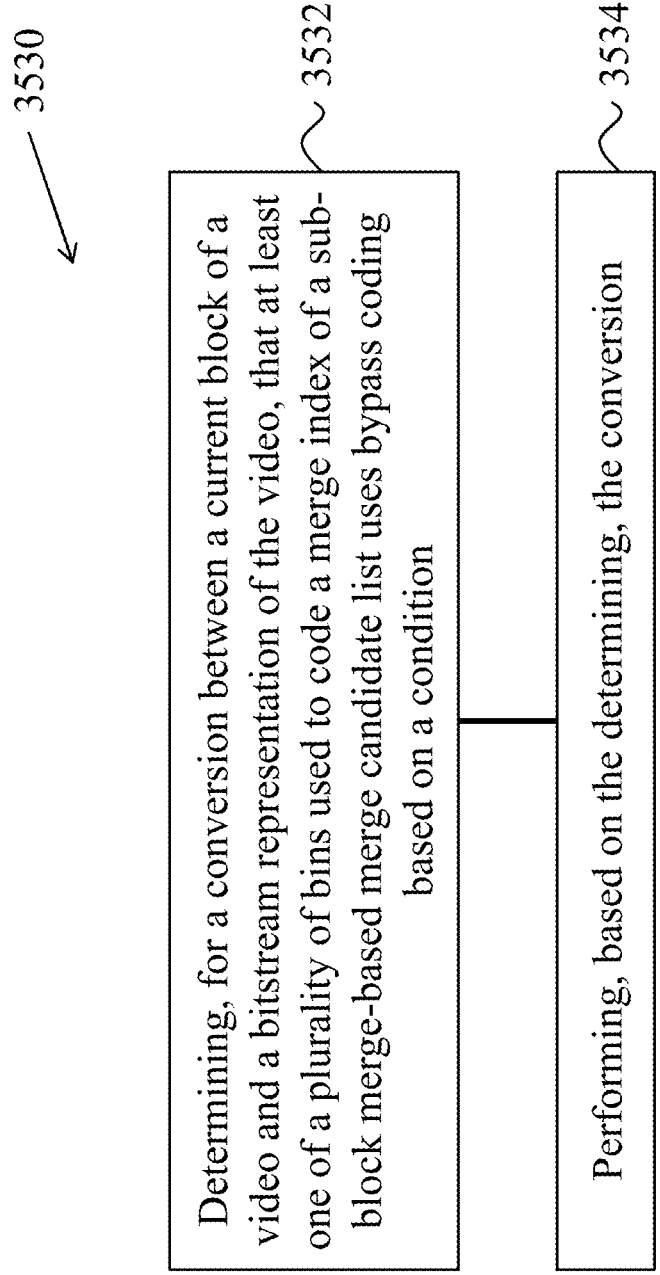

FIG. 35B shows a flowchart of an exemplary method for video processing. The method 3530 includes, at step 3532, determining, for a conversion between a current block of a video and a bitstream representation of the video, that at least one of a plurality of bins used to code a merge index of a sub-block merge-based merge candidate list uses bypass coding based on a condition.

The method 3530 includes, at step 3534, performing, based on the determining, the conversion.

Figure 35C:
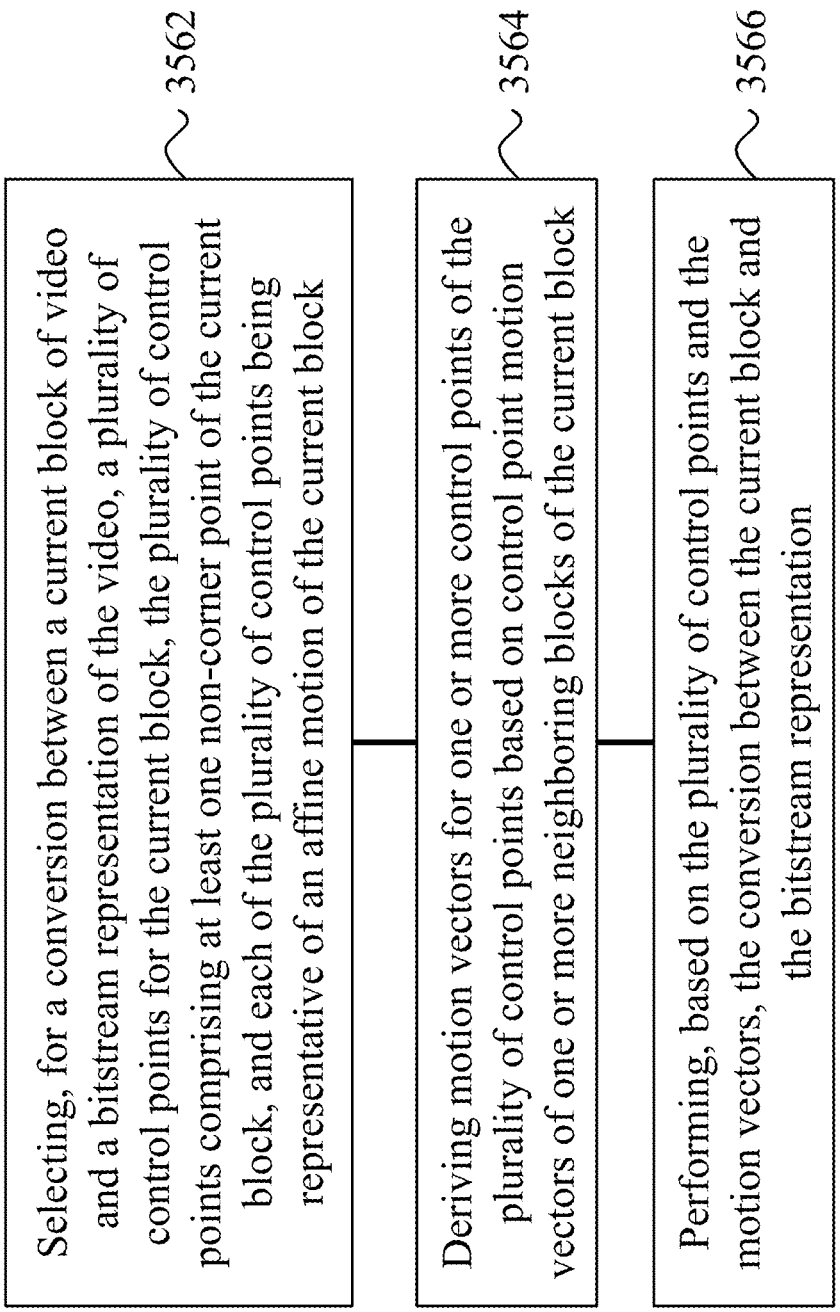

FIG. 35C shows a flowchart of an exemplary method for video processing. The method 3560 includes, at step 3562, selecting, for a conversion between a current block of video and a bitstream representation of the video, a plurality of control points for the current block, the plurality of control points comprising at least one non-corner point of the current block, and each of the plurality of control points being representative of an affine motion of the current block.

The method 3560 includes, at step 3564, deriving motion vectors for one or more control points of the plurality of control points based on control point motion vectors (CPMVs) of one or more neighboring blocks of the current block.

The method 3560 includes, at step 3566, performing, based on the plurality of control points and the motion vectors, the conversion between the current block and the bitstream representation.

In some embodiments, the following technical solutions may be implemented:

A1. A method (e.g., method 3500 in FIG. 35A) for video processing, comprising: selecting (3502), for a conversion between a current block of a video and a bitstream representation of the video, a plurality of control points for the current block, wherein the plurality of control points comprises at least one non-corner point of the current block, and wherein each of the plurality of control points is representative of an affine motion of the current block; and performing (3504), based on the plurality of control points, the conversion between the current block and the bitstream representation.

A2. The method of solution A1, wherein a size of the current block is W×H, wherein W and H are positive integers, wherein the current block is coded using a four-parameter affine model, and wherein the plurality of control points excludes (0, 0) and (W, 0).

A3. The method of solution A2, wherein the plurality of control points comprises (0, 0) and (W/2, 0).

A4. The method of solution A2, wherein the plurality of control points comprises (0, 0) and (0, H/2).

A5. The method of solution A2, wherein the plurality of control points comprises (W, 0) and (0, H).

A6. The method of solution A2, wherein the plurality of control points comprises (W, 0) and (W, H).

A7. The method of solution A2, wherein the plurality of control points comprises (W/2, 0) and (W/2, H).

A8. The method of solution A2, wherein the plurality of control points comprises (W/4, H/4) and (3×W/4, 3×H/4).

A9. The method of solution A2, wherein the plurality of control points comprises (W/2, H/2) and (W, 0).

A10. The method of solution A2, wherein the plurality of control points comprises (W/2, H/2) and (0, 0).

A11. The method of solution A2, wherein the plurality of control points comprises (0, H/2) and (W, H/2).

A12. The method of solution A2, wherein the plurality of control points comprises (W/4, H/2) and (3×W/4, H/2).

A13. The method of solution A2, wherein the plurality of control points comprises (W/2, H/4) and (W/2, 3×H/4).

A14. The method of solution A2, wherein the plurality of control points comprises (3×W/4, H/4) and (W/4, 3×H/4).

A15. The method of solution A2, wherein the current block comprises a sub-block, wherein a size of the sub-block is sW×sH, and wherein sW and sH are positive integers.

A16. The method of solution A15, wherein the plurality of control points comprises (sW/2, 0) and (W/2+sW/2, 0).

A17. The method of solution A15, wherein the plurality of control points comprises (0, sH/2) and (0, H/2+sH/2).

A18. The method of solution A2 or A15, wherein the plurality of control points comprises (0, H/2) and (W/2, 0).

A19. The method of solution A2 or A15, wherein the plurality of control points comprises (0, H) and (W, 0).

A20. The method of solution A2 or A15, wherein the plurality of control points comprises (0, 0) and (W, H).

A21. The method of solution A1, wherein a size of the current block is W×H, wherein W and H are positive integers, wherein the current block is coded using a six-parameter affine model, and wherein the plurality of control points excludes (0, 0), (W, 0) and (0, H).

A22. The method of solution A21, wherein the plurality of control points comprises (W/2, 0), (0, H) and (W, H).

A23. The method of solution A21, wherein the plurality of control points comprises (0, 0), (W, 0) and (W/2, H).

A24. The method of solution A21, wherein the plurality of control points comprises (0, 0), (W, H/2) and (0, H).

A25. The method of solution A21, wherein the plurality of control points comprises (0, H/2), (W, 0) and (W, H).

A26. The method of solution A21, wherein the plurality of control points comprises (W/4, H/4), (3×W/4, H/4) and (3×W/4, 3×H/4).

A27. The method of solution A21, wherein the plurality of control points comprises (3×W/4, H/4), (W/4, 3×H/4) and (3×W/4, 3×H/4).

A28. The method of solution A21, wherein the plurality of control points comprises (0, 0), (W, 0) and (0, H/2).

A29. The method of solution A21, wherein the plurality of control points comprises (0, 0), (W, 0) and (W, H/2).

A30. The method of solution A21, wherein the current block comprises a sub-block, wherein a size of the sub-block is sW×sH, and wherein sW and sH are positive integers.

A31. The method of solution A30, wherein the plurality of control points comprises (3×W/4-sW/2, H/4), (W/4-sW/2, 3×H/4) and (3×W/4-sW/2, 3×H/4).

A32. The method of solution A30, wherein the plurality of control points comprises (3×W/4-sW/2, H/4-sH/2), (W/4-sW/2, 3×H/4-sH/2) and (3×W/4-sW/2, 3×H/4-sH/2).

A33. The method of solution A1, wherein the selecting the plurality of control points is based on at least one of motion information, a size or shape of the current block, a slice type, a picture type, or a tile type.

A34. The method of solution A33, wherein the size of the current block is W×H, wherein W and H are positive integers, and wherein the current block is coded using a four-parameter affine model.

A35. The method of solution A34, wherein W≥H.

A36. The method of solution A35, wherein the plurality of control points comprises (W/2, 0) and (W/2, H).

A37. The method of solution A35, wherein the plurality of control points comprises (W/4, H/2) and (3×W/2, H/2).

A38. The method of solution A35, wherein the plurality of control points comprises (0, H/2) and (W, H/2).

A39. The method of solution A34, wherein W≤H.

A40. The method of solution A39, wherein the plurality of control points comprises (W/2, 0) and (W/2, H).

A41. The method of solution A39, wherein the plurality of control points comprises (W/2, H/4) and (W/2, 3×H/4).

A42. The method of solution A39, wherein the plurality of control points comprises (0, H/2) and (W, H/2).

A43. The method of solution A33, wherein the size of the current block is W×H, wherein W and H are positive integers, and wherein the current block is coded using a six-parameter affine model.

A44. The method of solution A43, wherein W≥H, and wherein the plurality of control points comprises (0, 0), (W/2, H) and (W, H).

A45. The method of solution A43, wherein W≥H, and wherein the plurality of control points comprises (0, 0), (0, H) and (W, H/2).

A46. The method of any of solutions A1 to A45, wherein one or more motion vectors corresponding to the plurality of control points are stored in a buffer than is different from a normal motion vector buffer.

A47. The method of any of solutions A1 to A45, wherein one or more motion vectors corresponding to the plurality of control points are stored in a normal motion vector buffer.

A48. The method of solution A1, wherein the current block is coded using an affine merge mode or an affine inter mode, and wherein the method further comprises: using, based on locations of the plurality of control points in the current block, temporal motion information to derive one or more constructed affine merge or advanced motion vector prediction (AMVP) candidates.

A49. The method of solution A48, wherein the locations of the plurality of control points exclude a top row and a left column of the current block.

A50. The method of solution A48, wherein the temporal motion information is derived from a block that is located within a first tile, picture or slice that is different from a second tile, picture or slice comprising the current block.

A51. The method of solution A48, wherein the temporal motion information is derived from a co-located reference picture or a co-located reference block.

A52. The method of solution A51, wherein the co-located reference picture is signaled in a picture parameter set (PPS), a sequence parameter set (SPS), a slice header, or a tile group header.

A53. The method of solution A51, wherein the co-located reference picture is determined by checking neighboring motion information of the current block.

A54. The method of solution A51, wherein the co-located reference picture corresponds to a referenced picture that is most frequently used by neighboring blocks of the current block.

A55. The method of solution A1, wherein the current block is coded using an affine inter mode, and wherein the method further comprises: predicting, based on a motion vector difference (MVD) of a first control point of the plurality of control points, an MVD of a second control point of the plurality of control points.

A56. The method of solution A55, wherein the first control point is (W/4, H/4), and wherein the second control point is (3×W/4, 3×H/4).

A57. The method of solution A1, wherein enabling the selecting of the plurality of control points is based on signaling in a sequence parameter set (SPS), a video parameter set (VPS), a picture parameter set (PPS), a sequence header, a picture header, a slice header or a tile group header.

A58. The method of solution A57, wherein a coding mode of the current block excludes an affine merge mode.

A59. The method of solution A57, wherein at least one affine motion vector difference (MVD) is coded for the current block.

A60. The method of solution A57, wherein at least one non-zero affine motion vector difference (MVD) is coded for the current block.

A61. The method of solution A1, wherein enabling the selecting the plurality of control points is based on a reference picture of the current block.

A62. The method of solution A61, wherein the reference picture is different from a current picture comprising the current block.

A63. The method of solution A1, wherein a number of samples in the current block is greater than or equal to K, and wherein K is a positive integer.

A64. The method of solution A1, wherein a number of samples in the current block is less than or equal to K, and wherein K is a positive integer.

A65. The method of solution A63 or A64, wherein K=16, 32 or 64.

A66. The method of solution A1, wherein a height or a width of the current block is greater than K, wherein K is a positive integer.

A67. The method of solution A66, wherein K=8.

A68. The method of solution A1, wherein selecting the plurality of control points is performed in at least one of the plurality of sub-blocks of the current block upon a determination that a height or a width of the current block is greater than or equal to a threshold (L).

A69. The method of solution A68, wherein L=64, wherein a size of the current block is 64×128, 128×64 or 128×128, and wherein a size of each of the plurality of sub-blocks is 64×64.

A70. The method of solution A68, wherein L=64, wherein a size of the current block is N×128 or 128×N, and wherein a size of both of the plurality of sub-blocks is N×64 or 64×N, respectively.

A71. The method of solution A1, wherein one or more motion vectors corresponding to the plurality of control points are stored in a first buffer that is different from a second buffer that comprises conventional motion vectors used for motion compensation.

A72. The method of solution A71, wherein the one or more motion vectors are stored with a 1/N pel precision, wherein the conventional motion vectors are stored with a 1/M pel precision, and wherein M and N are integer.

A73. The method of solution A72, wherein M=N, and wherein M=4 or 16.

A74. The method of solution A72, wherein M=4 and N=16.

A75. The method of solution A1, further comprising: modifying, prior to performing the conversion, the plurality of control points, wherein the conversion comprises deriving an affine motion field; and converting the affine motion field to align a precision of the affine motion field to a precision of a motion vector used for motion compensation.

A76. The method of solution A75, wherein the modifying comprises applying a shifting operation to at least one of the plurality of control points.

A77. The method of solution A76, wherein the shifting operation is defined as: $f(x)=x<<L$, wherein L is a positive integer.

A78. The method of solution A77, wherein L=2.

A79. The method of solution A75, wherein the modifying comprises applying a rounding operation or a scaling operation to align a precision of at least one of the plurality of control points to a precision of a motion vector used for motion compensation.

A80. The method of solution A79, wherein the rounding operation is defined as: $f(x)=(x+\text{offset})>>L$, wherein offset= $(1<<(L-1))$, and wherein L is a positive integer.

A81. The method of solution A80, wherein L is based on a precision of a regular motion vector or a motion vector for one of the plurality of control points.

A82. The method of any of solutions A1 to A81, wherein the conversion generates the current block from the bitstream representation.

A83. The method of any of solutions A1 to A81, wherein the conversion generates the bitstream representation from the current block.

A84. An apparatus in a video system comprising a processor and a non-transitory memory with instructions thereon, wherein the instructions upon execution by the processor, cause the processor to implement the method in any one of solutions A1 to A83.

A85. A computer program product stored on a non-transitory computer readable media, the computer program product including program code for carrying out the method in any one of solutions A1 to A83.

In some embodiments, the following technical solutions may be implemented:

B1. A method (e.g., method 3530 in FIG. 35B) for video processing, comprising: determining (3532), for a conversion between a current block of a video and a bitstream representation of the video, that at least one of a plurality of bins used to code a merge index of a sub-block merge-based merge candidate list uses bypass coding based on a condition; and performing (3534), based on the determining, the conversion.

B2. The method of solution B1, wherein a first bin of the plurality of bins is coded with at least one context, and wherein all other bins of the plurality of bins are bypass coded.

B3. The method of solution B2, wherein the at least one context consists of one context.

B4. The method of solution B2, wherein the at least one context consists of three contexts.

B5. The method of solution B4, wherein the three contexts are defined as: ctxIdx=aboveBlockIsAffineMode+leftBlockIsAffineMode, wherein aboveBlockIsAffineMode=1 if an above neighboring block to the current block is coded using a first affine mode and zero otherwise, and wherein leftBlockIsAffineMode=1 if a left neighboring block to the current block is coded using a second affine mode and zero otherwise.

B6. The method of solution B1, wherein each of a first K bins of the plurality of bins is coded with at least one context, wherein all other bins of the plurality of bins are bypass coded, wherein K is a non-negative integer, wherein 0≤K≤maxSubMrgListLen−1, and wherein maxSubMrgListLen is a maximum length of the plurality of bins.

B7. The method of solution B6, wherein one context is shared for the first K bins except for a first bin of the first K bins.

B8. The method of solution B6, wherein one context is used for each of the first K bins except for a first bin of the first K bins.

B9. The method of any of solutions B1 to B8, wherein the sub-block merge-based merge candidate list includes a sub-block temporal motion vector prediction (SbTMVP) candidate.

B10. The method of any of solutions B1 to B8, wherein the sub-block merge-based merge candidate list includes one or more inherited affine candidates, one or more constructed affine candidates, or one or more zero candidates.

B11. The method of any of solutions B1 to B10, wherein the conversion generates the current block from the bitstream representation.

B12. The method of any of solutions B1 to B10, wherein the conversion generates the bitstream representation from the current block.

B13. An apparatus in a video system comprising a processor and a non-transitory memory with instructions thereon, wherein the instructions upon execution by the processor, cause the processor to implement the method in any one of solutions B1 to B12.

B14. A computer program product stored on a non-transitory computer readable media, the computer program product including program code for carrying out the method in any one of solutions B1 to B12.

In some embodiments, the following technical solutions may be implemented:

C1. A method (e.g., method 3560 in FIG. 35C) for video processing, comprising: selecting (3562), for a conversion between a current block of video and a bitstream representation of the video, a plurality of control points for the current block, wherein the plurality of control points comprises at least one non-corner point of the current block, and wherein each of the plurality of control points is representative of an affine motion of the current block; deriving (3564) motion vectors for one or more control points of the plurality of control points based on control point motion vectors of one or more neighboring blocks of the current block; and performing (3566), based on the plurality of control points and the motion vectors, the conversion between the current block and the bitstream representation.

C2. The method of solution C1, wherein the one or more neighboring blocks comprises a first block coded with an affine mode, and wherein the motion vectors are derived for one or more sub-blocks in the current block that are directly adjacent to one or more sub-blocks in the first block.

C3. The method of solution C1, wherein the one or more control points comprises a control point in a top-left corner position of the current block.

C4. The method of solution C1, wherein the one or more control points comprises a control point in a center position of the current block, or in a center position of a sub-block of the current block that is located at a top row or a left column of the current block.

C5. The method of solution C1, wherein the one or more control points comprises a control point in a bottom-right corner position of the current block.

C6. The method of solution C1, wherein the derived motion vectors of the one or more control points are used in an overlapped block motion compensation (OMBC) process of the current block.

C7. The method of solution C1, wherein the current block is coded using at least one of a merge mode, an advanced motion vector prediction (AMVP) mode, a triangular mode, or an ultimate motion vector expression (UMVE) mode, wherein the UMVE mode comprises a motion vector expression that includes a starting point, a motion magnitude and a motion direction for the current block.

C8. The method of solution C7, wherein the deriving the motion vectors is based on a representative point in the current block.

C9. The method of solution C8, wherein the representative point is a center position or a top-left corner position of the current block.

C10. The method of solution C7, further comprising: inserting the motion vectors into an AMVP list, or a merge list, or a UMVE-based merge list, or a triangular merge list.

C11. The method of solution C7, further comprising: replacing at least one of the motion vectors of the one or more neighboring blocks with the derived motion vectors.

C12. The method of solution C11, wherein the one or more neighboring blocks are from a same affine-coded coding unit (CU) or prediction unit (PU).

C13. The method of solution C7, further comprising: inserting each of the derived motion vectors into a motion vector candidate list prior to normal motion vector predictors being inserted into the motion vector candidate list.

C14. The method of solution C7, further comprising: inserting each of the motion vectors into a motion vector candidate list subsequent to normal motion vector predictors being inserted into the motion vector candidate list.

C15. The method of solution C7, further comprising: inserting the motion vectors into a motion vector candidate list in an interleaved manner with normal motion vector predictors.

C16. The method of any of solutions C1 to C15, wherein the conversion generates the current block from the bitstream representation.

C17. The method of any of solutions C1 to C15, wherein the conversion generates the bitstream representation from the current block.

C18. An apparatus in a video system comprising a processor and a non-transitory memory with instructions thereon, wherein the instructions upon execution by the processor, cause the processor to implement the method in any one of solutions C1 to C17.

C19. A computer program product stored on a non-transitory computer readable media, the computer program product including program code for carrying out the method in any one of solutions C1 to C17.

5. Example Implementations of the Disclosed Technology

Figure 36:
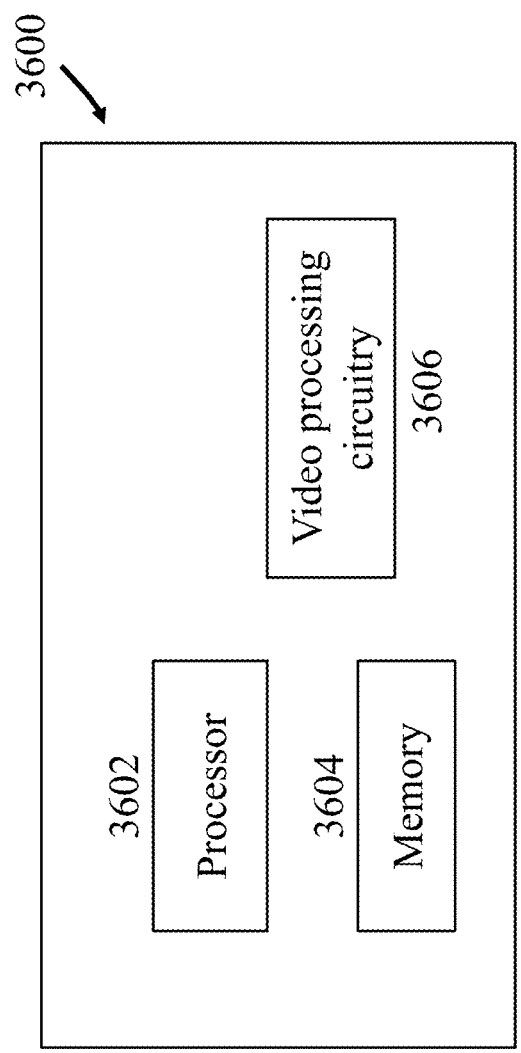
FIG. 36 is a block diagram of an example of a hardware platform for implementing a visual media decoding or a visual media encoding technique described in the present document.

FIG. 36 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods (including, but not limited to, methods 3500, 3530 and 3560) described in the present document. The memory (memories) 3604 may be used for storing data and code used for implementing the methods and techniques described herein. The video processing hardware 3606 may be used to implement, in hardware circuitry, some techniques described in the present document.

In some embodiments, the video coding methods may be implemented using an apparatus that is implemented on a hardware platform as described with respect to FIG. 36.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 37:
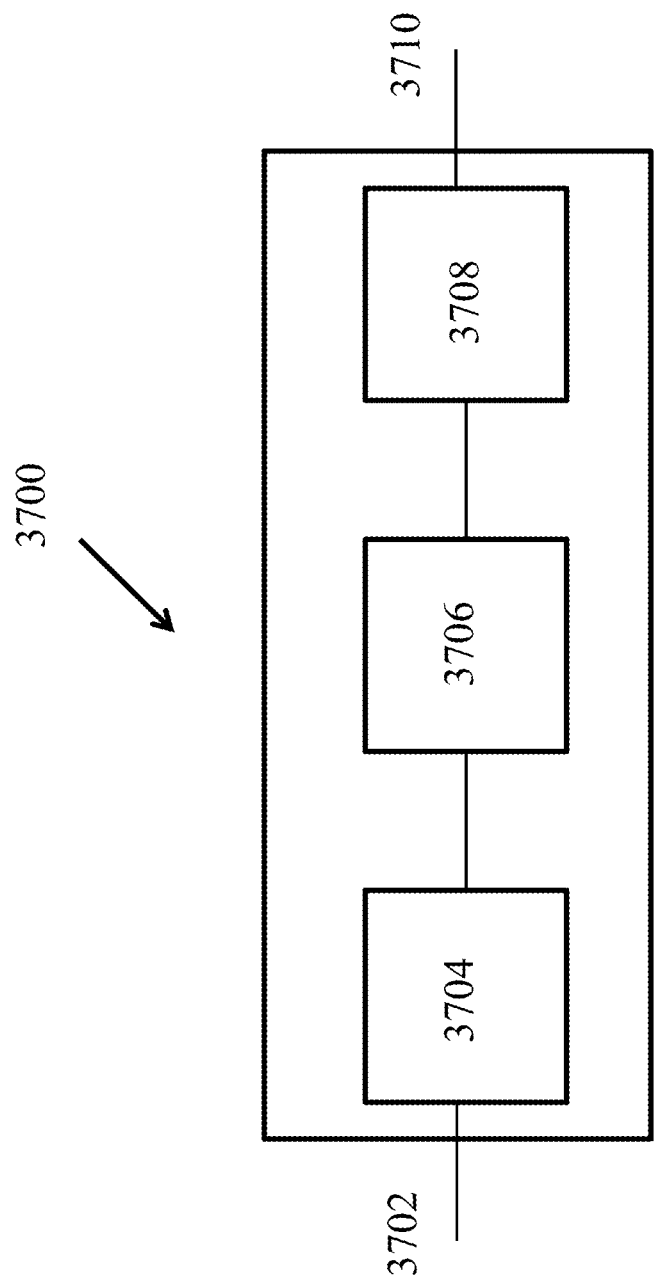
FIG. 37 is a block diagram of an example video processing system in which disclosed techniques may be implemented.

FIG. 37 is a block diagram showing an example video processing system 3700 in which various techniques disclosed herein may be implemented. Various implementations may include some or all of the components of the system 3700. The system 3700 may include input 3702 for receiving video content. The video content may be received in a raw or uncompressed format, e.g., 8 or 10 bit multi-component pixel values, or may be in a compressed or encoded format. The input 3702 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 3700 may include a coding component 3704 that may implement the various coding or encoding methods described in the present document. The coding component 3704 may reduce the average bitrate of video from the input 3702 to the output of the coding component 3704 to produce a coded representation of the video. The coding techniques are therefore sometimes called video compression or video transcoding techniques. The output of the coding component 3704 may be either stored, or transmitted via a communication connected, as represented by the component 3706. The stored or communicated bitstream (or coded) representation of the video received at the input 3702 may be used by the component 3708 for generating pixel values or displayable video that is sent to a display interface 3710. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of coding video data, comprising:
determining, for a conversion between a current video block of a video and a bitstream of the video, that at least one of a plurality of bins used to code a merge index of a sub-block merge-based merge candidate list uses bypass coding, wherein the sub-block merge-based merge candidate list is constructed based on a sub-block temporal motion vector prediction (SbTMVP) candidate; and
performing the conversion based on the determining,
wherein the SbTMVP candidate is derived based on a temporal motion shift from a spatial neighboring block of the current video block, and wherein a reference picture related to the temporal motion shift is same as a collocated picture of the current video block;
wherein the sub-block merge-based merge candidate list is constructed further based on an inherited affine candidate, a constructed affine candidate, or a zero candidate, and
wherein control point motion vectors of an inherited affine candidate is derived from control point motion vectors of a spatial neighboring block that is coded in affine mode, wherein the control point motion vectors and motion vectors in inter perdition mode are all stored with $\frac{1}{16}$-pel precision.

2. The method of claim 1, wherein the temporal motion shift is used to locate at least one region in a picture different from a current picture comprising the current video block.

3. The method of claim 1, wherein a first bin of the plurality of bins is coded with at least one context, and wherein all other bins of the plurality of bins are bypass coded.

4. The method of claim 3, wherein the at least one context consists of one context.

5. The method of claim 1, wherein each of a first K bins of the plurality of bins is coded with at least one context, wherein all other bins of the plurality of bins are bypass coded, wherein K is a non-negative integer, wherein 0≤K≤maxSubMrgListLen−1, and wherein maxSubMrgListLen is a maximum length of the plurality of bins.

6. The method of claim 1, wherein the conversion generates the current video block from the bitstream.

7. The method of claim 1, wherein the conversion generates the bitstream from the current video block.

8. An apparatus for coding video data comprising a processor and a non-transitory memory with instructions thereon, wherein the instructions upon execution by the processor, cause the processor to:
determining, for a conversion between a current video block of a video and a bitstream of the video, that at least one of a plurality of bins used to code a merge index of a sub-block merge-based merge candidate list uses bypass coding, wherein the sub-block merge-based merge candidate list is constructed based on a sub-block temporal motion vector prediction (SbTMVP) candidate; and
performing the conversion based on the determining,
wherein the SbTMVP candidate is derived based on a temporal motion shift from a spatial neighboring block of the current video block, and wherein a reference picture related to the temporal motion shift is same as a collocated picture of the current video block,
wherein the sub-block merge-based merge candidate list is constructed further based on an inherited affine candidate, a constructed affine candidate, or a zero candidate, and
wherein control point motion vectors of an inherited affine candidate is derived from control point motion vectors of a spatial neighboring block that is coded in affine mode, wherein the control point motion vectors and motion vectors in inter perdition mode are all stored with $\frac{1}{16}$-pel precision.

9. The apparatus of claim 8, wherein the temporal motion shift is used to locate at least one region in a picture different from a current picture comprising the current video block.

10. The apparatus of claim 8, wherein a first bin of the plurality of bins is coded with at least one context, and wherein all other bins of the plurality of bins are bypass coded.

11. The apparatus of claim 10, wherein the at least one context consists of one context.

12. The apparatus of claim 8, wherein the conversion generates the current video block from the bitstream.

13. The apparatus of claim 8, wherein the conversion generates the bitstream from the current video block.

14. A non-transitory computer-readable storage medium storing instruction that cause a processor to:
determining, for a conversion between a current video block of a video and a bitstream of the video, that at least one of a plurality of bins used to code a merge index of a sub-block merge-based merge candidate list uses bypass coding, wherein the sub-block merge-based merge candidate list is constructed based on a sub-block temporal motion vector prediction (SbTMVP) candidate; and performing the conversion based on the determining, wherein the SbTMVP candidate is derived based on a temporal motion shift from a spatial neighboring block of the current video block, and wherein a reference picture related to the temporal motion shift is same as a collocated picture of the current video block, wherein the sub-block merge-based merge candidate list is constructed further based on an inherited affine candidate, a constructed affine candidate, or a zero candidate, and wherein control point motion vectors of an inherited affine candidate is derived from control point motion vectors of a spatial neighboring block that is coded in affine mode, wherein the control point motion vectors and motion vectors in inter perdition mode are all stored with 1/16-pel precision.

15. A non-transitory computer-readable recording medium storing a bitstream of a video which is generated by a method performed by a video processing apparatus, wherein the method comprises:

determining, for a conversion between a current video block of a video and a bitstream of the video, that at least one of a plurality of bins used to code a merge index of a sub-block merge-based merge candidate list uses bypass coding, wherein the sub-block merge-based merge candidate list is constructed based on a sub-block temporal motion vector prediction (SbTMVP) candidate; and generating the bitstream from the current video block based on the determining, wherein the SbTMVP candidate is derived based on a temporal motion shift from a spatial neighboring block of the current video block, and wherein a reference picture related to the temporal motion shift is same as a collocated picture of the current video block, wherein the sub-block merge-based merge candidate list is constructed further based on an inherited affine candidate, a constructed affine candidate, or a zero candidate, and wherein control point motion vectors of an inherited affine candidate is derived from control point motion vectors of a spatial neighboring block that is coded in affine mode, wherein the control point motion vectors and motion vectors in inter perdition mode are all stored with 1/16-pel precision.

* * * * *

UNITED STATES PATENT AND TRADEMARK OFFICE
CERTIFICATE OF CORRECTION

PATENT NO.         : 11,006,106 B2
APPLICATION NO.    : 16/998348
DATED              : May 11, 2021
INVENTOR(S)        : Hongbin Liu et al.

It is certified that error appears in the above-identified patent and that said Letters Patent is hereby corrected as shown below:

On the Title Page
In Item (30), under "Foreign Application Priority Data", Line 2, delete "October 31, 2008" and insert -- October 23, 2018 --, therefore.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*